(12) United States Patent
Kobayashi et al.

(10) Patent No.: US 12,265,188 B2
(45) Date of Patent: Apr. 1, 2025

(54) APPARATUS AND SYSTEM

(71) Applicant: CANON KABUSHIKI KAISHA, Tokyo (JP)

(72) Inventors: Tsuyoshi Kobayashi, Kanagawa (JP); Takanori Taya, Kanagawa (JP); Jun Kawanabe, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 18/323,128

(22) Filed: May 24, 2023

(65) Prior Publication Data

US 2023/0384464 A1 Nov. 30, 2023

(30) Foreign Application Priority Data

May 30, 2022 (JP) .................................. 2022-087839
Sep. 30, 2022 (JP) .................................. 2022-157705

(51) Int. Cl.
*G01T 1/17* (2006.01)
*G01T 7/00* (2006.01)

(52) U.S. Cl.
CPC .................. *G01T 1/17* (2013.01); *G01T 7/00* (2013.01)

(58) Field of Classification Search
CPC .................................. G01T 1/17; G01T 7/00
See application file for complete search history.

(56) References Cited

U.S. PATENT DOCUMENTS

2019/0187309 A1* 6/2019 Misaki ............. H01L 27/14636

FOREIGN PATENT DOCUMENTS

| JP | 2002330342 A | | 11/2002 |
| JP | 2017200522 A | * | 11/2017 |
| JP | 2019148509 A | * | 9/2019 |

\* cited by examiner

*Primary Examiner* — Kiho Kim

(74) *Attorney, Agent, or Firm* — Canon U.S.A., Inc. IP Division

(57) ABSTRACT

An apparatus includes a plurality of pixels each including a conversion element, and a shielding layer covering the conversion element, wherein the shielding layer is provided to cover at least a part of an aperture of the conversion element so that an aperture modulated transfer function (MTF) at a predetermined frequency of a signal obtained from the conversion element becomes less than or equal to a predetermined value.

20 Claims, 30 Drawing Sheets

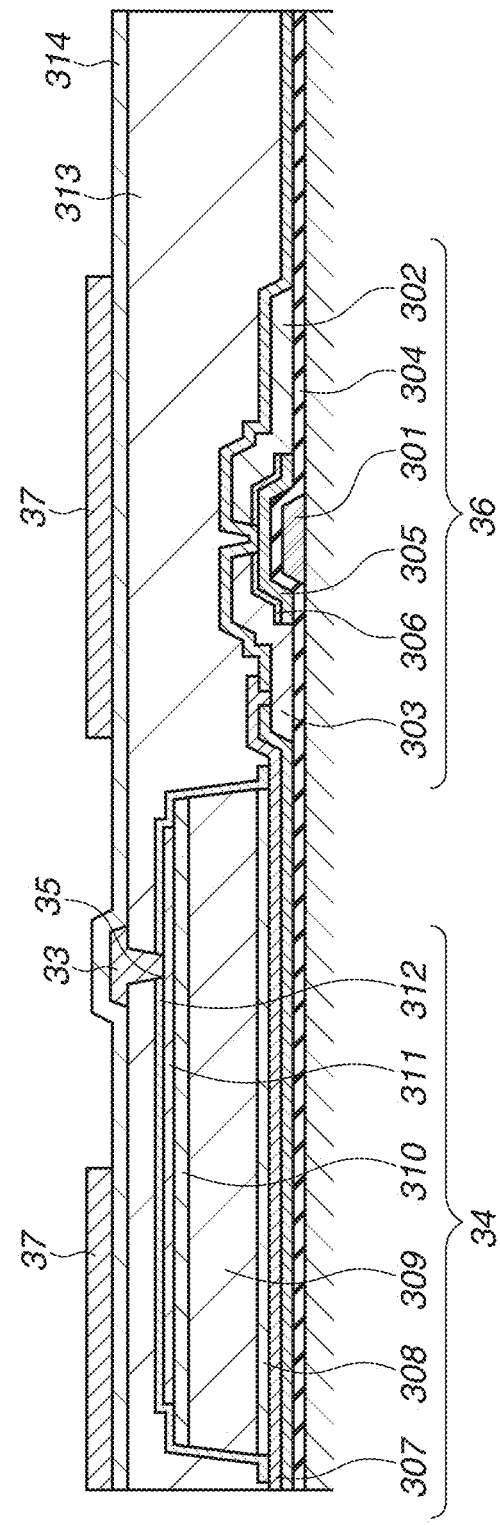

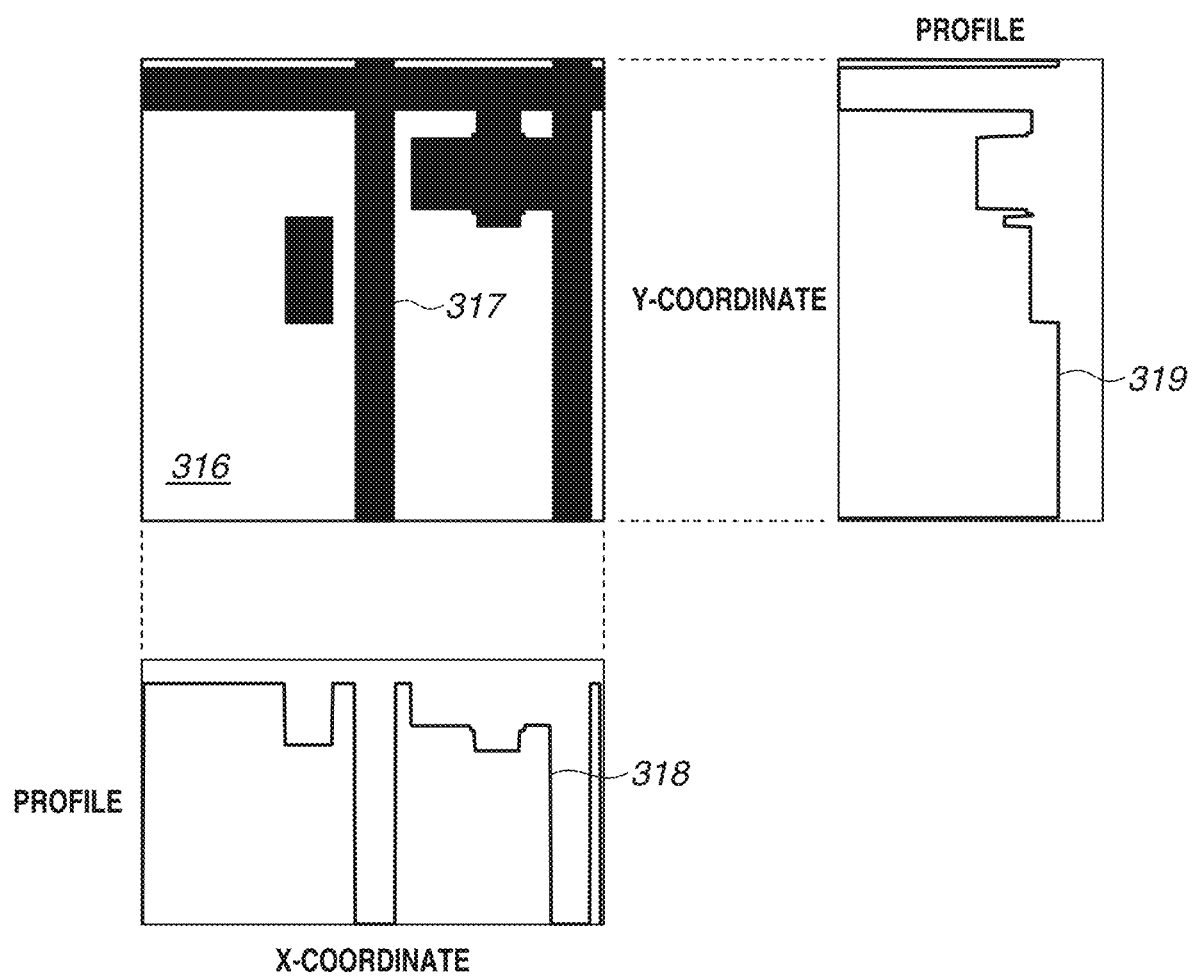

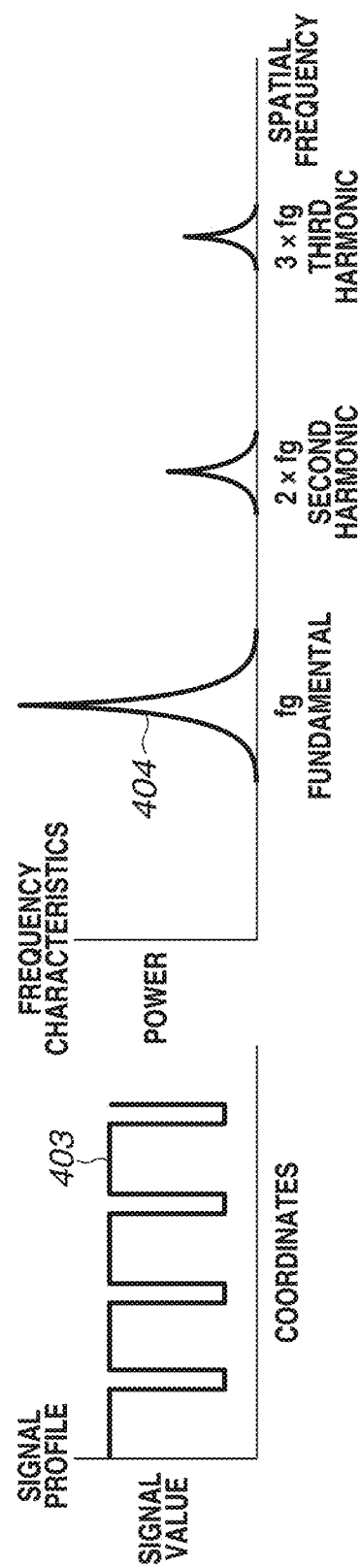

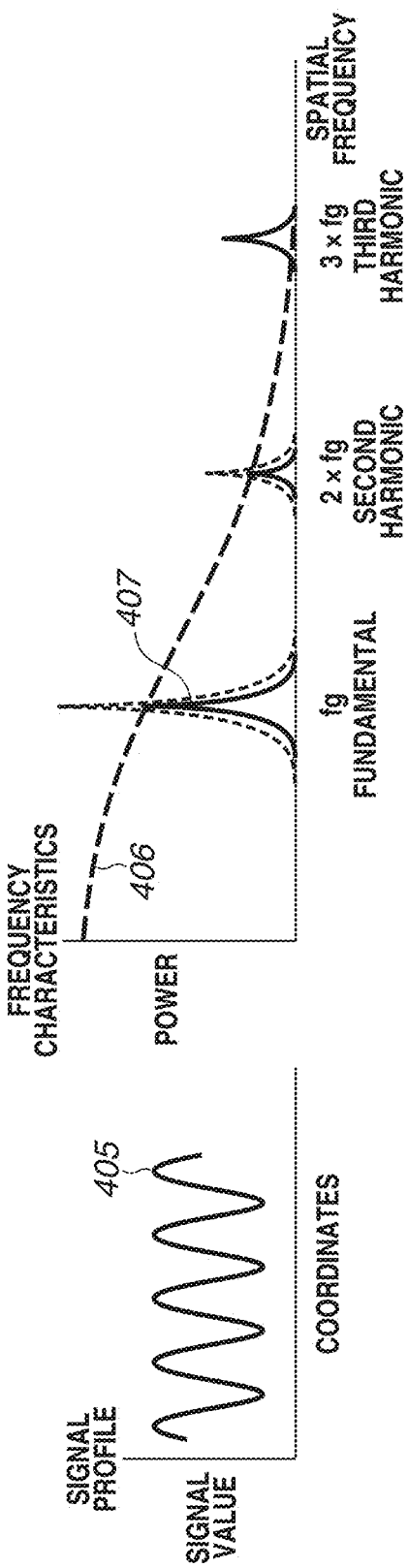

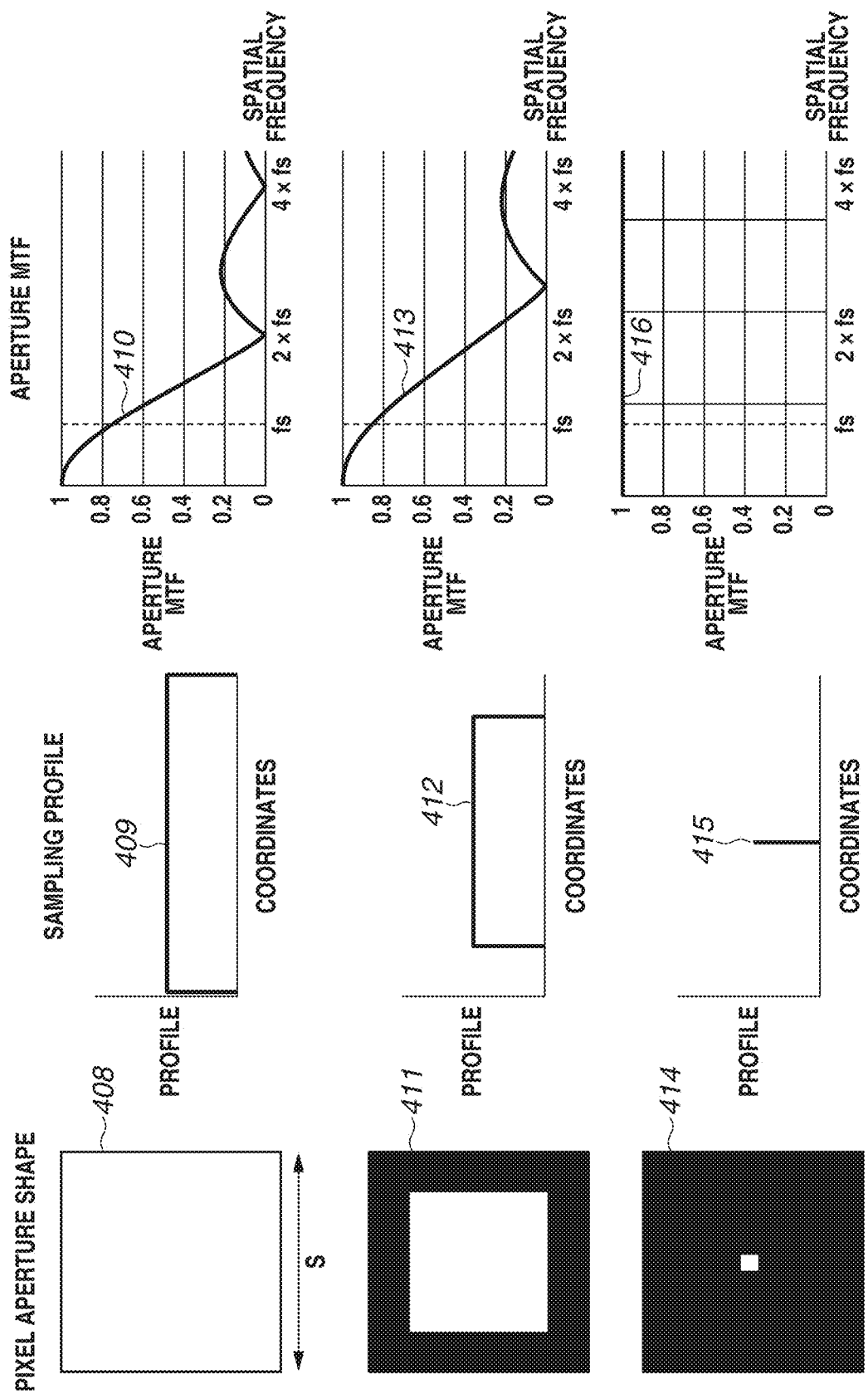

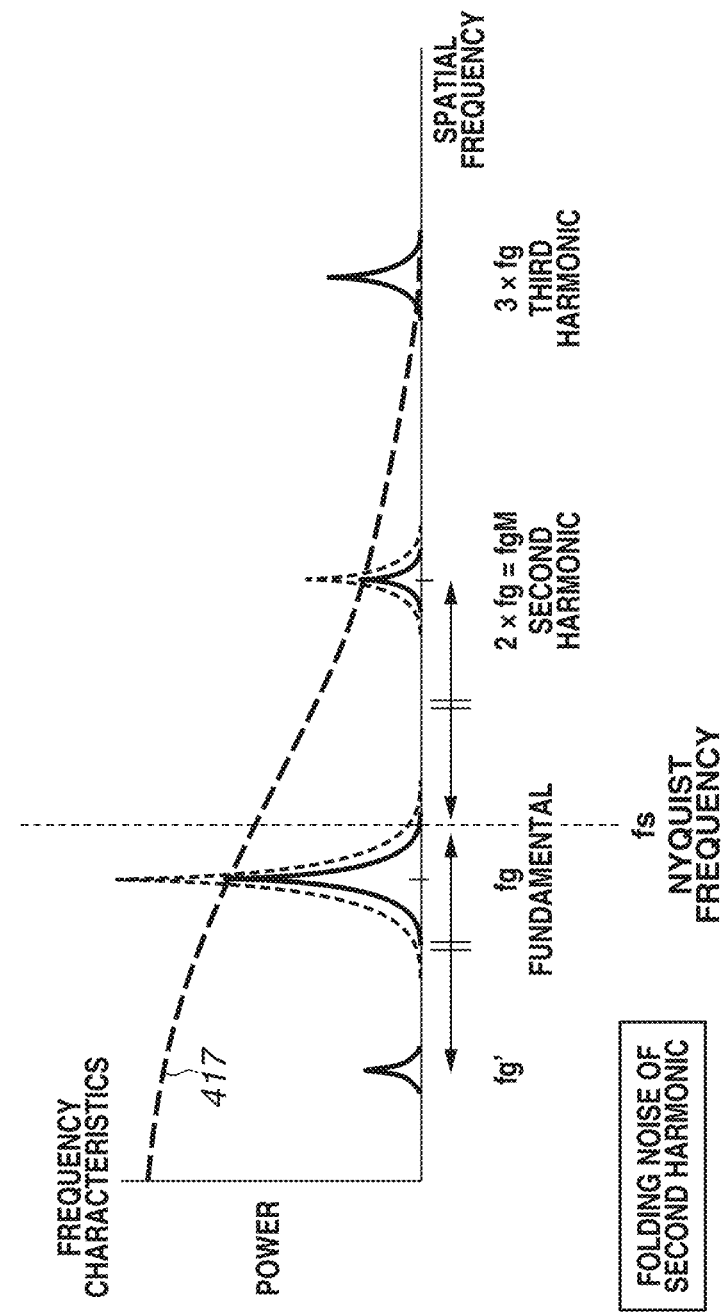

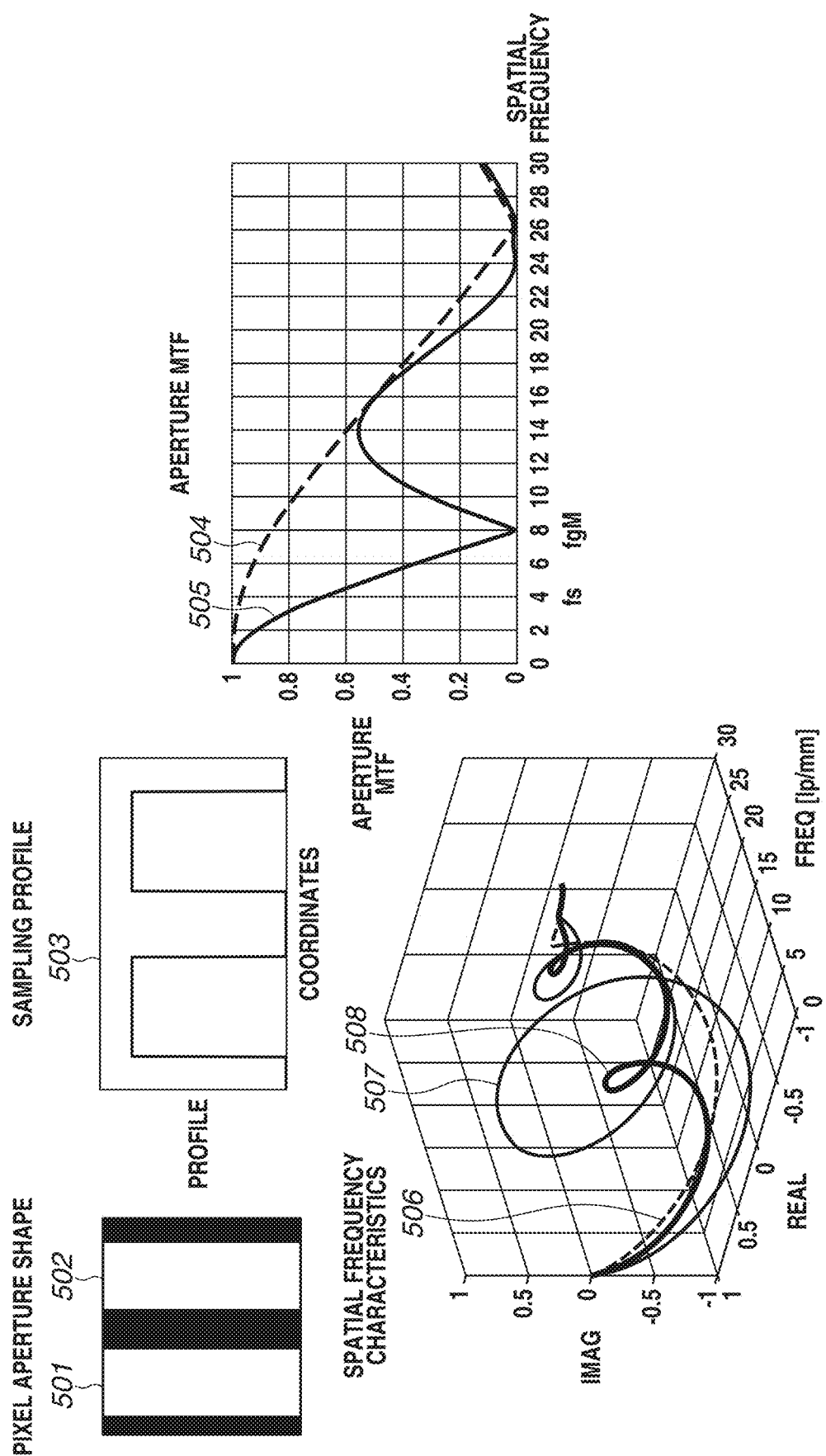

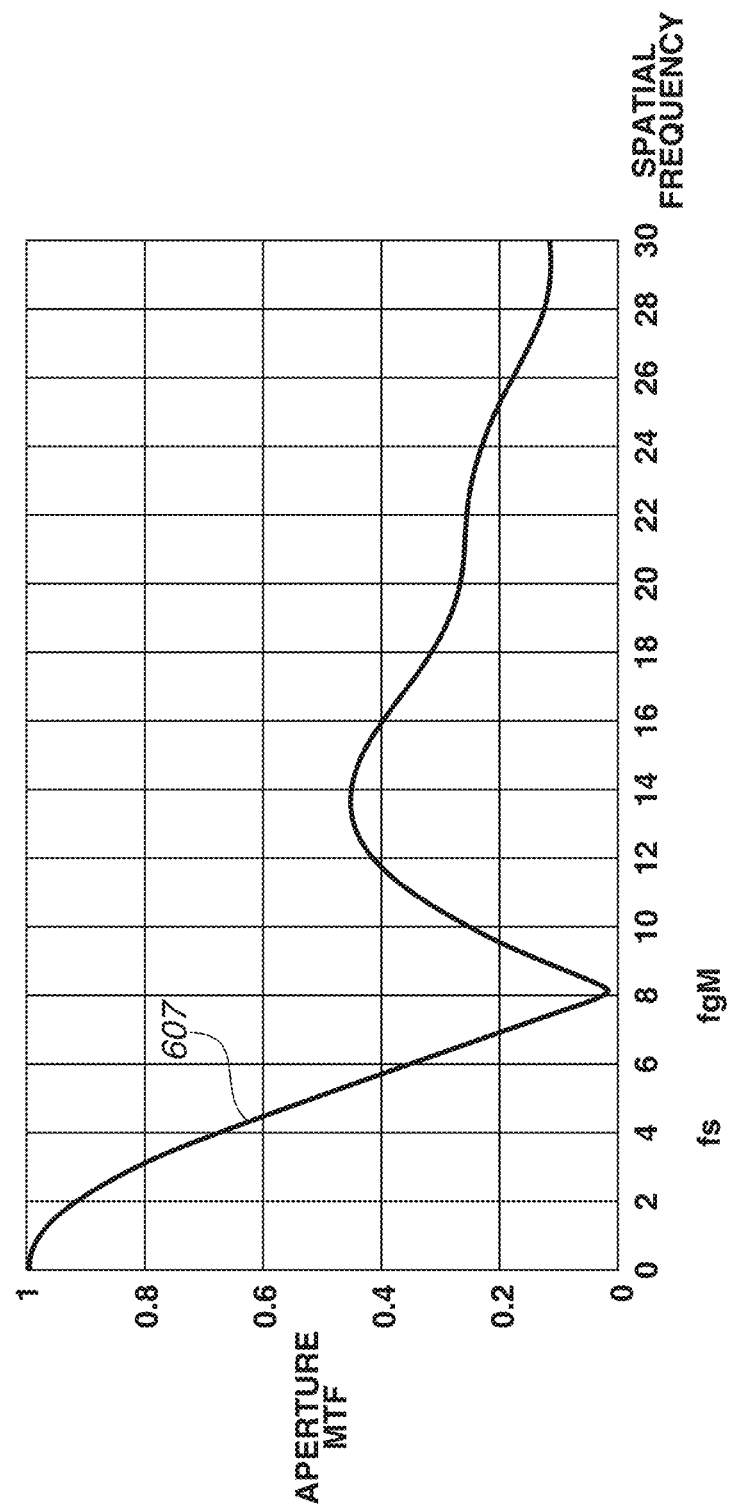

FIG.8C
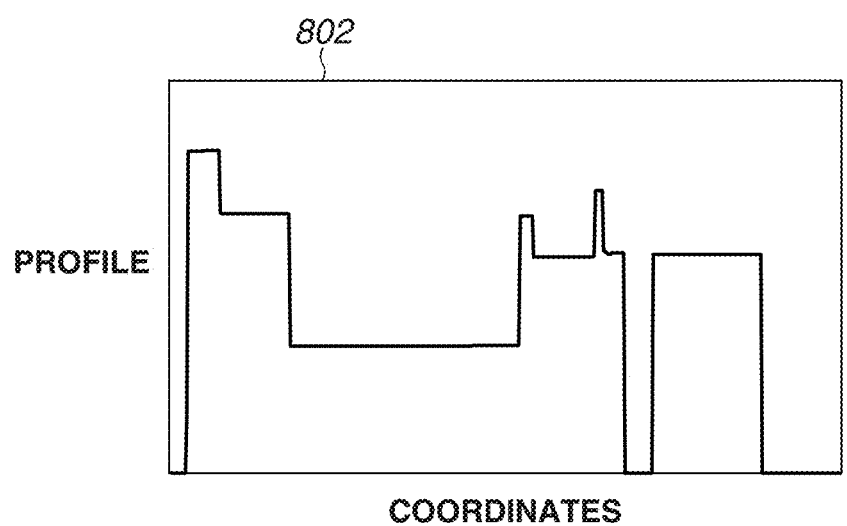
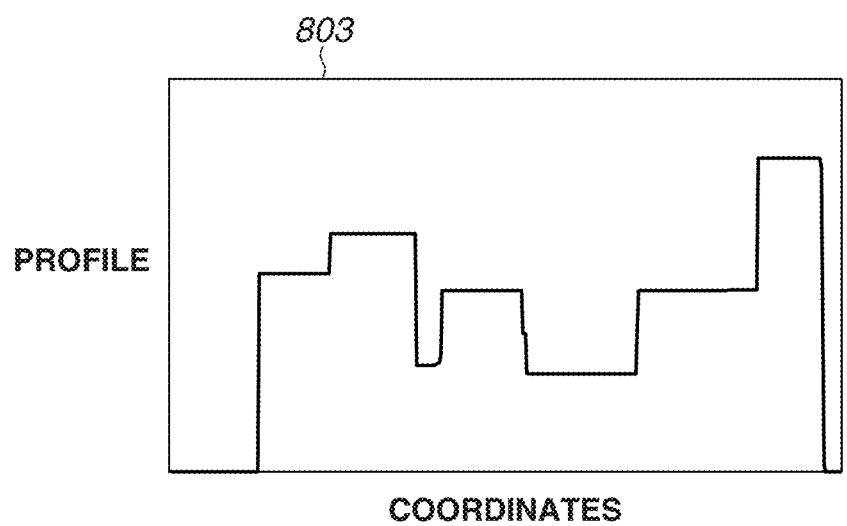

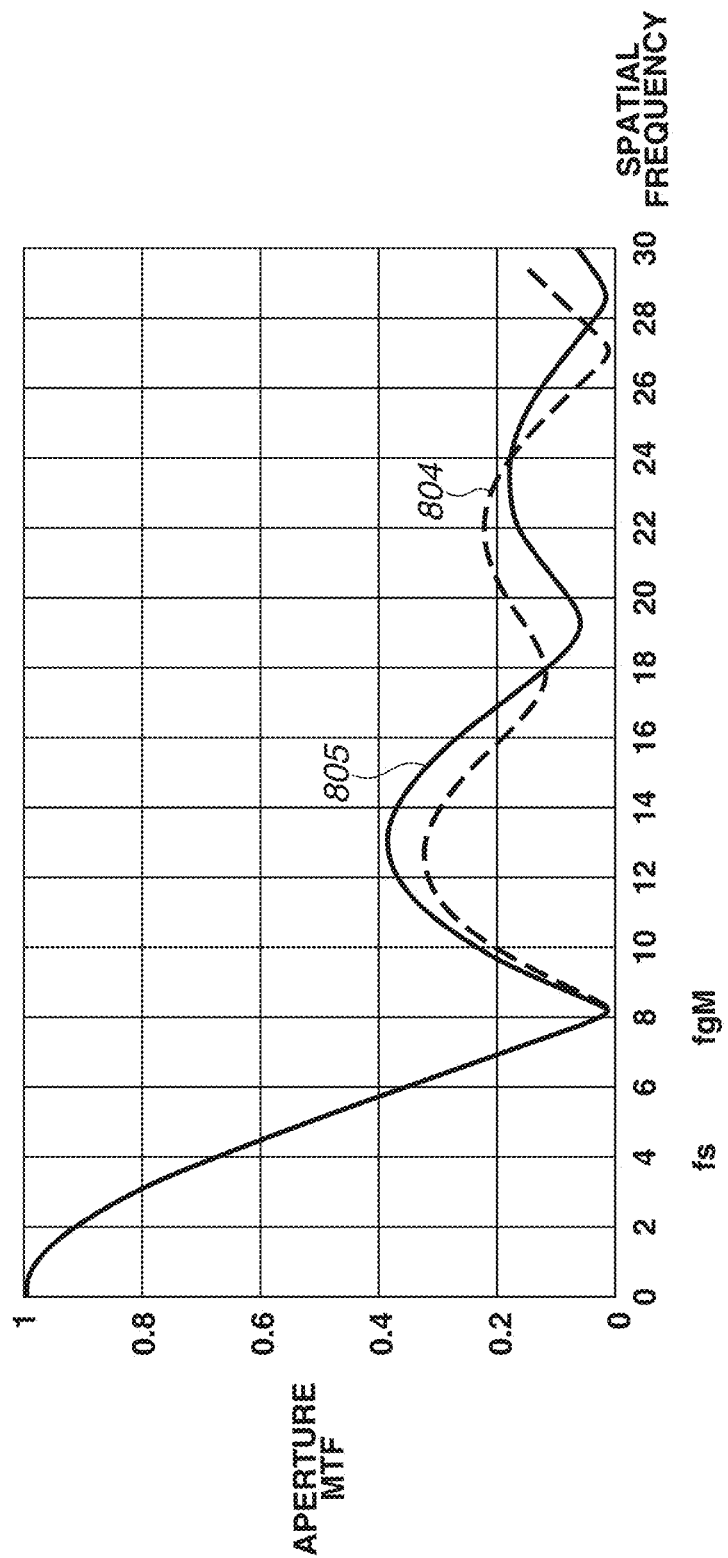

FIG.9C
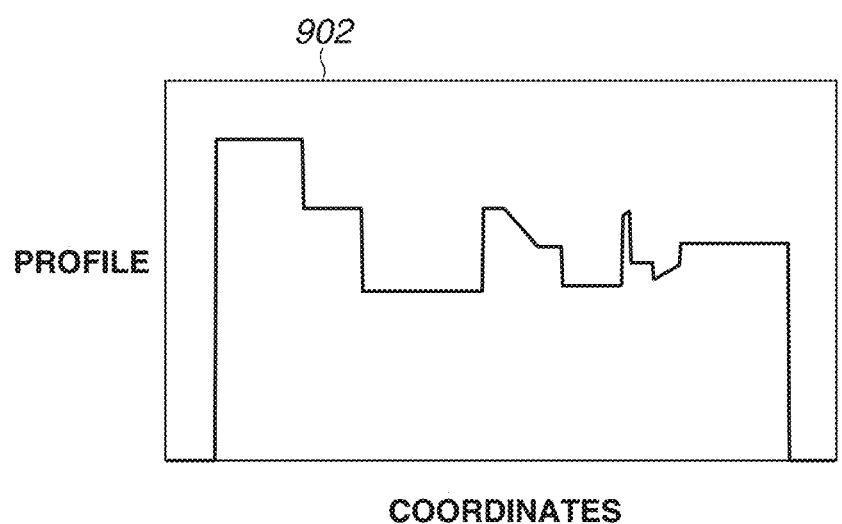
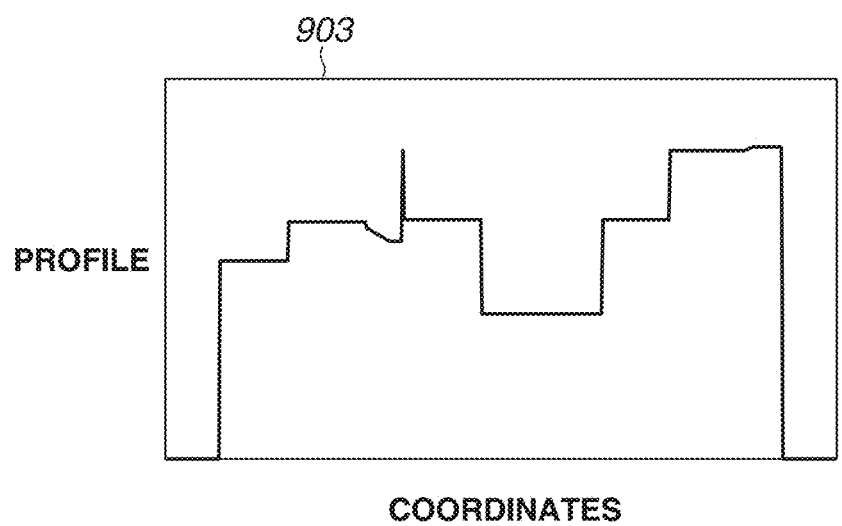

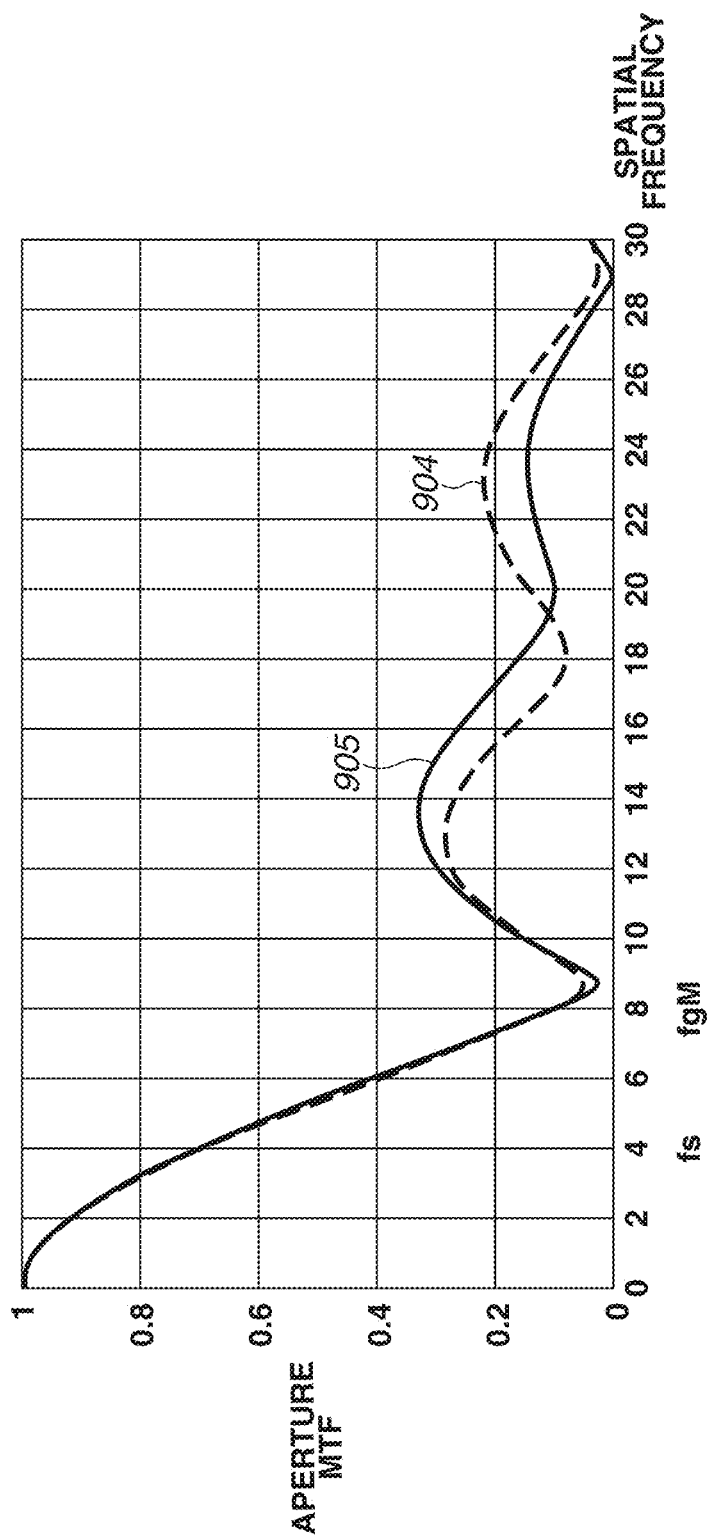

APPARATUS AND SYSTEM

BACKGROUND

Technical Field

The aspect of the embodiments relates to a radiation imaging apparatus and a radiation imaging system.

Description of the Related Art

In recent years, radiation imaging apparatuses each including a detection unit to detect radiation such as an X-ray have been widely used in the industrial, medical, and other fields. In particular, digital radiography (DR) apparatuses that obtain radiological images using a photoelectric conversion element or the like made of a material such as a fluorescence body to convert an X-ray into visible light, amorphous silicon, or the like, are in widespread use. Such radiation imaging apparatuses are configured to convert the magnitude of a signal of radiation that has transmitted through an object into a digital value and use the digital value as a radiological image.

The radiological image thus obtained includes not only a signal component corresponding to primary radiation that travels directly from a radiation source through an object, but also a signal component corresponding to scattered rays that are generated by radiation scattered within the object. The signal component corresponding to the scattered rays can degrade the contrast of an object image. Accordingly, a scattering ray removing grid (hereinafter simply referred to as a grid) is generally arranged between the object and the detection unit.

The grid is formed by a radiation shielding substance, such as lead, and a radiation transmission substance, such as aluminum or carbon, with a predetermined width that are alternately arranged to remove the scattered rays. However, the grid generates a periodic signal (hereinafter referred to as a grid pattern) on an image, which may disturb an observer. In this regard, Japanese Patent Application Laid-Open No. 2002-330342 discusses a method for removing a generated grid pattern by image processing.

SUMMARY

According to an aspect of the embodiments, an apparatus includes a plurality of pixels each including a conversion element, and a shielding layer covering the conversion element, wherein the shielding layer is provided to cover at least a part of an aperture of the conversion element so that an aperture modulated transfer function (MTF) at a predetermined frequency of a signal obtained from the conversion element becomes less than or equal to a predetermined value.

Further features of the disclosure will become apparent from the following description of exemplary embodiments with reference to the attached drawings.

BRIEF DESCRIPTION OF THE DRAWINGS

FIG. 3B is a sectional view of the pixel according to the exemplary embodiment.

FIG. 3C illustrates a pixel aperture shape and a sampling profile according to the exemplary embodiment.

FIG. 4B illustrates a profile of a signal amount when a grid is irradiated with an X-ray, and frequency characteristics of the signal.

FIG. 4C illustrates a signal profile of visible light when an X-ray incident on a fluorescence body is converted into visible light, and frequency characteristics of the signal.

FIG. 4D illustrates examples of an aperture shape of a pixel unit, a primary sampling profile, and an aperture modulated transfer function (MTF).

FIG. 4E is a schematic graph illustrating frequency characteristics when an image of a grid is captured by the radiation imaging apparatus according to the exemplary embodiment.

FIG. 5 schematically illustrates a pixel, a sampling profile, frequency characteristics of the aperture MTF, and spatial frequency characteristics of signals associated with sampling according to the exemplary embodiment.

FIG. 6D illustrates an example of frequency characteristics of the aperture MTF of a pixel according to the exemplary embodiment.

FIG. 8C illustrates examples of a sampling profile of a pixel according to the exemplary embodiment.

FIG. 8D illustrates an example of frequency characteristics of the aperture MTF of a pixel according to the exemplary embodiment.

FIG. 9C illustrates examples of a sampling profile of a pixel according to the exemplary embodiment.

FIG. 9D illustrates an example of frequency characteristics of the aperture MTF of a pixel according to the exemplary embodiment.

DESCRIPTION OF THE EMBODIMENTS

Figure 1:
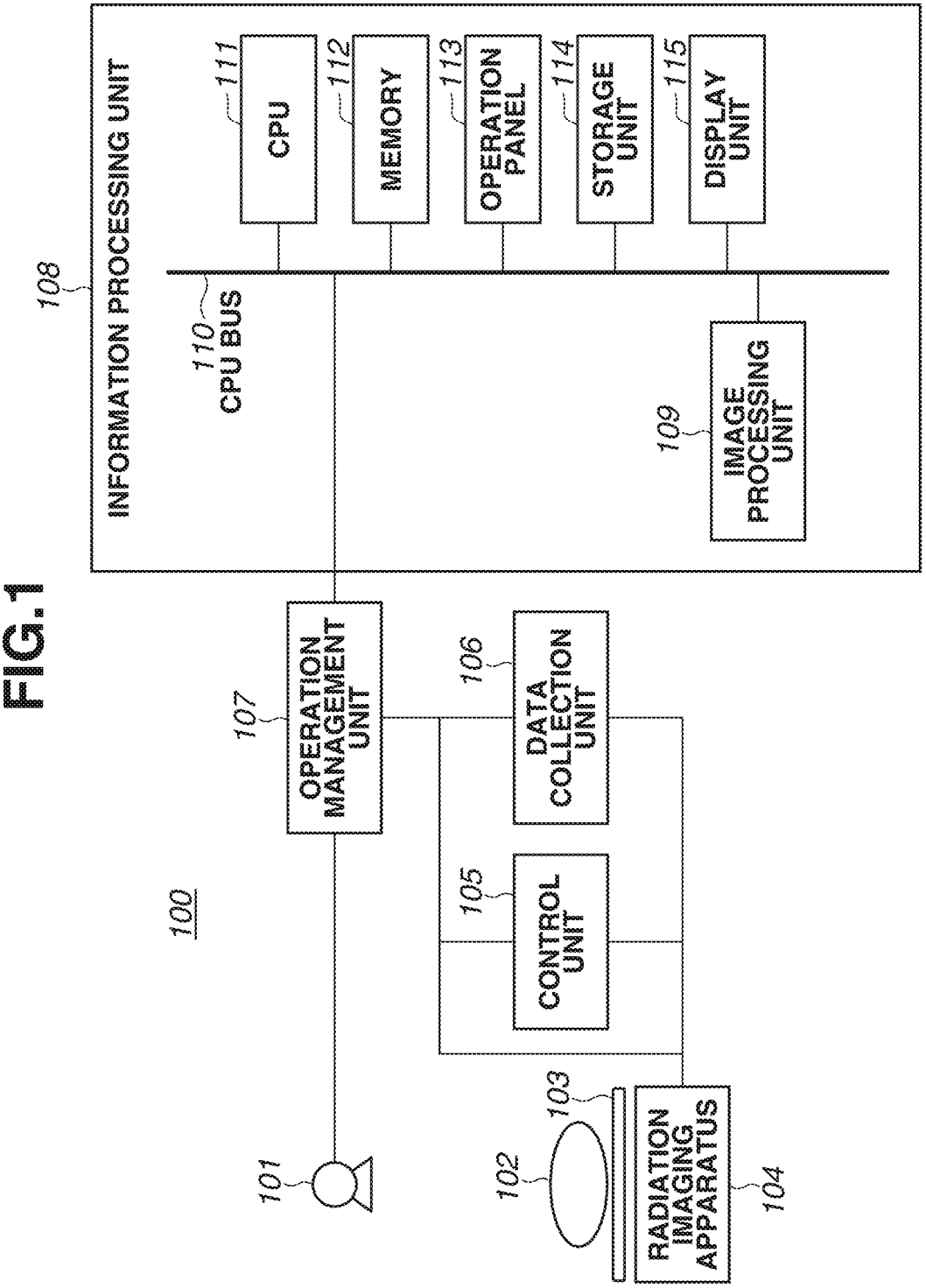
FIG. 1 is a block diagram schematically illustrating a configuration of a radiation imaging system according to an exemplary embodiment.

An exemplary embodiment of the disclosure is directed to providing a technique for effectively preventing generation of a grid pattern.

In the related art, periodic signals of a grid pattern are selectively removed. However, depending on a relationship between a sampling pitch and a grid density in a radiation imaging apparatus, for example, a peak frequency of the grid pattern can be generated in an extremely low frequency region. In such a case, it is difficult to distinguish an object signal from a grid pattern signal, which may cause an adverse effect on the object signal.

In particular, for example, in a case where a frequency peak of the grid pattern is present in a region where the frequency exceeds the Nyquist frequency determined by the sampling pitch of the radiation imaging apparatus, the grid pattern appears as folding noise in an image. Accordingly, a phenomenon in which a peak is generated in a low-frequency region and the peak appears, for example, as a moire-like pattern in an image is more likely to occur.

It is known that an amount of generated grid pattern is affected by a pre-sampling modulated transfer function (MTF) of a fluorescence body. The pre-sampling MTF is represented by a product of an analog MTF included in the fluorescence body (hereinafter referred to as an analog MTF) and an aperture MTF formed based on an aperture shape of each pixel included in the radiation imaging apparatus.

In the fluorescence body made of cesium iodide (CsI) or gadolinium oxysulfide (GOS) that is generally used for a radiation imaging apparatus, the analog MTF is attenuated as a spatial frequency increases. However, it is known that the analog MTF does not become zero (0) and has a certain value even in a frequency region where the frequency exceeds the Nyquist frequency of the radiation imaging apparatus. On the other hand, as for the aperture MTF, it is known that characteristics of frequency components that exceed the Nyquist frequency vary greatly depending on the aperture shape of each pixel.

The above-described properties may cause an increase in the amount of grid pattern generated as folding noise in an image, for example, depending on the aperture shape of each pixel.

Accordingly, a radiation imaging apparatus according to an exemplary embodiment of the disclosure includes a plurality of pixels each including a photoelectric conversion element, and a light-shielding layer covering the photoelectric conversion element. The light-shielding layer according to the present exemplary embodiment may be located to cover at least a part of an aperture of the photoelectric conversion element such that the aperture MTF at a predetermined spatial frequency in a signal obtained from the photoelectric conversion element becomes less than or equal to a predetermined value.

With this configuration, for example, the generation of a grid pattern can be effectively prevented.

Exemplary embodiments of the disclosure will be described in detail below with reference to the drawings. The dimensions, materials, shapes, relative positions of components, and the like described in the following exemplary embodiments are not particularly limited, and can be changed depending on the configuration of an apparatus or various conditions. Further, identical or functionally similar elements are denoted by the same reference numerals throughout the drawings.

In the following exemplary embodiments of the present disclosure, radiation is not limited to the generally used X-ray. Examples of the radiation include beams of particles (including photons) emitted due to radioactive decay, such as an alpha ($\alpha$) ray, a beta ($\beta$) ray, and a gamma ($\gamma$) ray, as well as beams having equivalent or higher energy, such as particle beams and cosmic rays. An example where an X-ray is used as the radiation will be described below.

First, a configuration example of a radiation imaging system according to the present exemplary embodiment will be described with reference to FIG. 1. FIG. 1 is a block diagram illustrating a basic configuration example of the radiation imaging system according to the present exemplary embodiment.

A radiation imaging system 100 is a system that performs radiation imaging using an object 102 as an imaging target. The radiation imaging system 100 includes a radiation generation apparatus 101, a radiation imaging apparatus 104 that outputs image data based on radiation that has transmitted through the object 102, and a grid 103 that is mounted on the radiation imaging apparatus 104.

The radiation imaging system 100 also includes an operation management unit 107 that controls generation of radiation by the radiation generation apparatus 101, synchronization of an image operation timing of the radiation imaging apparatus 104, and generation conditions for the radiation generation apparatus 101. The radiation imaging system 100 also includes a control unit 105 that controls operation of the radiation imaging apparatus 104, and a data collection unit 106 that collects various digital data output from the radiation imaging apparatus 104. The radiation imaging system 100 also includes an information processing unit 108 that performs image processing and controls operation of the entire system in response to instructions from a user.

The radiation imaging apparatus 104, the control unit 105, the data collection unit 106, the operation management unit 107, and the information processing unit 108 are connected with a wire or wirelessly. Functions of the control unit 105, the data collection unit 106, and the operation management unit 107 may be shared among individual apparatuses, or some or all of the functions may be shared by the radiation imaging apparatus 104 or the information processing unit 108. The grid 103 is detachably mounted depending on the intended use of imaging.

The information processing unit 108 includes an image processing unit 109, a central processing unit (CPU) 111, a memory 112, an operation panel 113, a storage unit 114, and a display unit 115. These units are electrically connected via a CPU bus 110. The memory 112 stores various data and the like to be used for processing in the CPU 111, and includes a work memory for the CPU 111.

The CPU 111 controls the operation of the entire system according to user's instructions input to the operation panel 113 using the memory 112.

The radiation imaging system 100 starts a sequence of imaging the object 102 according to a user's instruction through the operation panel 113. An X-ray satisfying a predetermined condition is emitted from the radiation generation apparatus 101, and the radiation imaging apparatus 104 is irradiated with the X-ray that has passed through the object 102. The operation management unit 107 controls X-ray generation conditions, such as a voltage, a current, and an irradiation time, and synchronization with the operation of the radiation imaging apparatus 104, thereby enabling the radiation generation apparatus 101 to generate the X-ray satisfying a predetermined imaging condition at an appropriate timing.

The radiation imaging apparatus 104 that is controlled by the control unit 105 converts information about the X-ray that has passed through the object 102 and includes object information into an electric signal, and the data collection unit 106 collects the electric signal as digital image data.

The image data collected by the data collection unit 106 is transferred to the information processing unit 108 via the operation management unit 107, and is further transferred to the memory 112 via the CPU bus 110 under the control of the CPU 111. The image processing unit 109 applies various image processing, including grid pattern reduction processing, to the image data stored in the memory 112, and creates images suitable for diagnosis. The created images are stored in the storage unit 114 and are displayed on the display unit 115.

Figure 2:
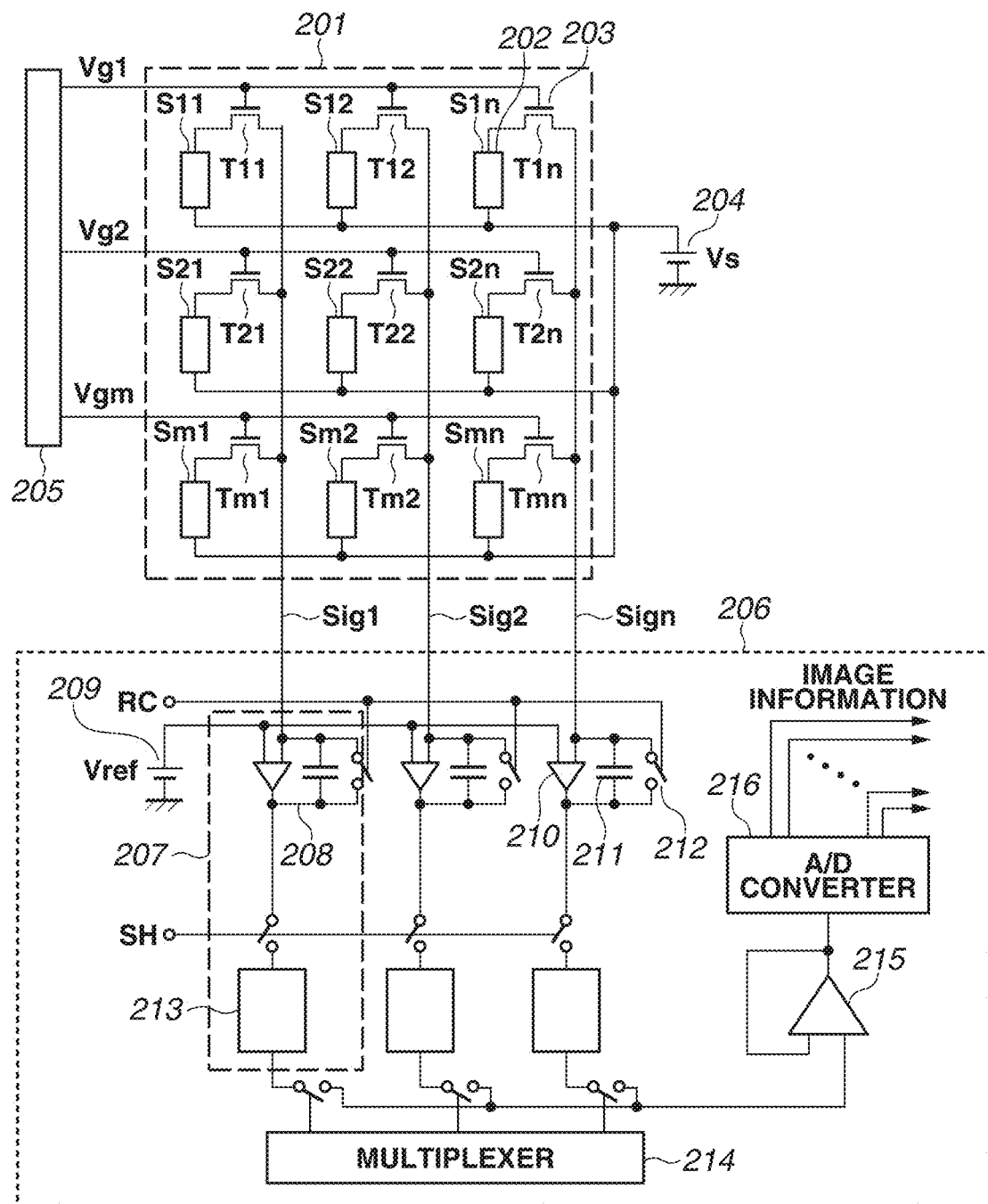
FIG. 2 is a block diagram schematically illustrating a configuration of a radiation imaging apparatus according to an exemplary embodiment.

Next, a configuration example of the radiation imaging apparatus 104 will be described with reference to FIG. 2. FIG. 2 illustrates the configuration example of the radiation imaging apparatus 104 illustrated in FIG. 1. A pixel unit 201 includes a plurality of pixels arranged in a matrix. FIG. 2 schematically illustrates an example where m×n pixels are two-dimensionally arranged in the pixel unit 201. As the number of pixels arranged in the pixel unit 201, several thousands or more pixels may be arranged on a side, such as 2688×2688 pixels, in many cases.

The pixels include a plurality of photoelectric conversion elements 202 and a plurality of switch elements 203, respectively. The photoelectric conversion elements 202 convert light from the fluorescence body (not illustrated in FIG. 2) into electric charges. The switch elements 203 output electric signals based on the converted electric charges to plurality of signal lines Sig1 to Sign, respectively, in each row.

The present exemplary embodiment illustrates an example where a P-Intrinsic-N (PIN) photodiode that is made primarily of amorphous silicon and is located on an insulating substrate, such as a glass substrate, is used as each photoelectric conversion element 202, and a material made of cesium iodide (CsI) is used as the fluorescence body.

For example, a transistor, such as a thin-film transistor (hereinafter referred to as a TFT), that includes a control terminal and two main terminals is suitably used as each switch element 203. One of electrodes (first electrode) of each photoelectric conversion element 202 is electrically connected to one of the two main terminals of the corresponding switch element 203, and the other electrode (second electrode) is electrically connected to a bias power supply unit 204 via a common bias line Vs.

The bias line Vs supplies a bias voltage from the bias power supply unit 204 to all of the photoelectric conversion elements 202. Control terminals of a plurality of switch elements Tm1 to Tmn in an m-th row are electrically connected in common to a drive line Vgm in the m-th row. A drive control unit 205 supplies a drive signal to control a conductive state of each of the switch elements Tm1 to Tmn via the drive line Vgm in each row.

The drive control unit 205 outputs the drive signal, including a conductive voltage to bring switch elements T11 to Tmn into a conductive state and a non-conductive voltage to bring the switch elements T11 to Tmn into a non-conductive state, to each of drive lines Vg1 to Vgm in response to a control signal input from the control unit 105. Thus, the drive control unit 205 controls the conductive state and the non-conductive state of each of the switch elements T11 to Tmn to drive the pixel unit 201.

The other main terminal of each of a plurality of switch elements T1n to Tmn in an n-th column is electrically connected to the signal line Sign in the n-th column. While the switch elements T1n to Tmn are in the conductive state, electric signals corresponding to electric charges of conversion elements S1n to Smn are output to a readout control unit 206 via the signal line Sign. The plurality of signal lines Sig1 to Sign arranged in a column direction outputs electric signals output from the plurality of pixels in parallel to the readout control unit 206. The readout control unit 206 reads signals from the plurality of signal lines Sig1 to Sign.

In the readout control unit 206, amplification units 207 that amplify electric signals output in parallel from the pixel unit 201 are located corresponding to the signal lines Sig1 to Sign, respectively. Each amplification unit 207 includes an integrating amplifier 208 that amplifies the output electric signal, and a sample-and-hold unit 213 that samples and holds the amplified electric signal.

The integrating amplifier 208 includes an operational amplifier 210 that amplifies and outputs the read electric signal, a capacitor 211, and a reset switch 212. The integrating amplifier 208 is configured to change an amplification factor by changing the capacitance of the capacitor 211 located at each of an inverting input terminal and an output terminal of the operational amplifier 210.

The inverting input terminals of operational amplifiers 210 receive the electric signals from the signal lines Sig1 to Sign, respectively. A non-inverting input terminal of each operational amplifier 210 receives a reference potential Vref generated by a reference power supply unit 209, and the amplified electric signal is output from the output terminal. The amplified electric signal is transmitted to a multiplexer 214 via the sample-and-hold unit 213.

The multiplexer 214 sequentially outputs the electric signals read in parallel from the amplification units 207 as serial image signals, and transmits the image signals to a buffer amplifier 215 that converts the image signals into an impedance to be output. An analog-to-digital (A/D) converter 216 converts the image signals that are analog electric signals output from the buffer amplifier 215 into digital image data with a predetermined number of gradation levels, such as 14-bit data or 16-bit data, and outputs the digital image data to the data collection unit 106.

A voltage to be applied to each of the bias power supply unit 204 and the reference power supply unit 209 and control setting values such as an integral capacitance and an operating clock for the drive control unit 205 can be changed by the control unit 105.

Figure 3A:
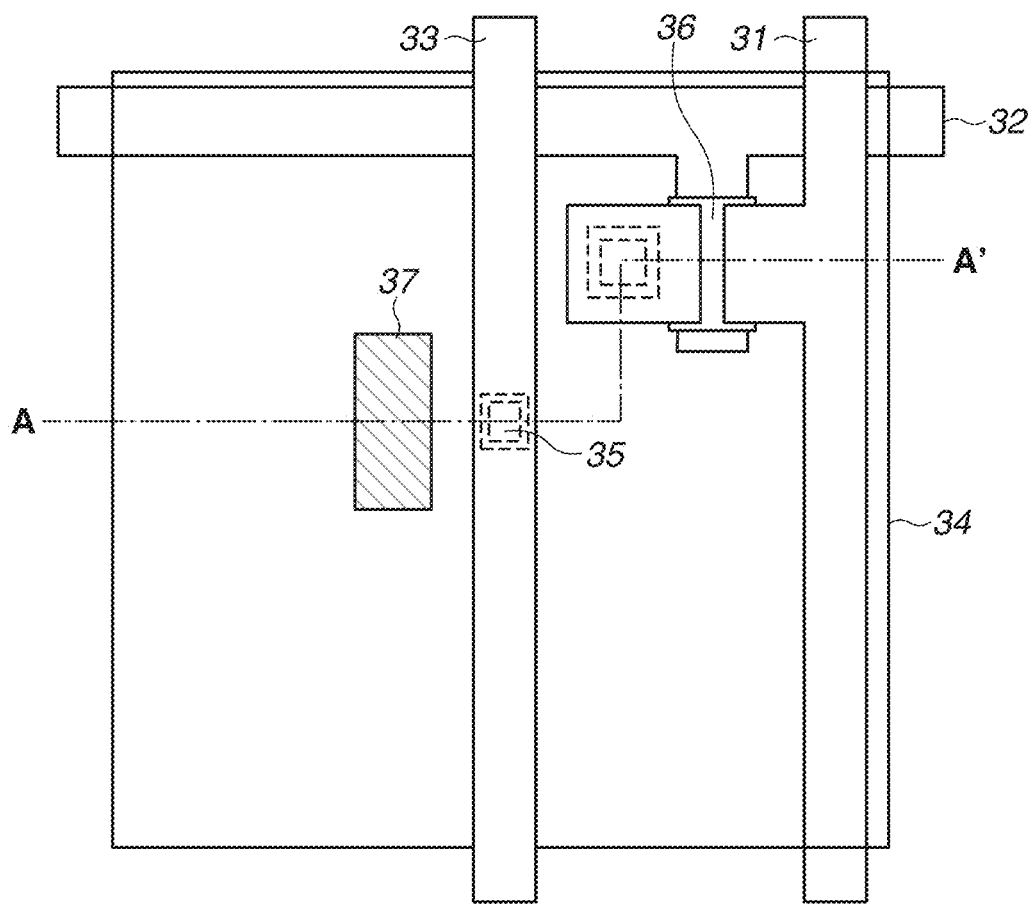
FIG. 3A is a plan view illustrating a pixel according to the exemplary embodiment.

Next, a detailed structure of each pixel will be describes with reference to FIGS. 3A to 3C. FIG. 3A is a plan view illustrating a detailed structure of the pixel. Although not illustrated, the fluorescence body is located above the structure so that an X-ray is converted into visible light. Various wiring lines including a photoelectric conversion element 34 and a TFT 36 are located below the fluorescence body.

The photoelectric conversion element 34 is electrically connected to a signal line 31 via the TFT 36. An upper electrode of the photoelectric conversion element 34 is electrically connected to a bias line 33 and is configured to apply a constant bias voltage to the photoelectric conversion element 34.

With the structure as described above, when the X-ray reaches the pixel, the photoelectric conversion element 34 can transfer the electric signal generated when visible light emitted from the fluorescence body is received to the signal line 31 via the TFT 36, thereby making it possible to form an image signal. A light-shielding portion 37 can be located at any position on the photoelectric conversion element 34.

FIG. 3B is a sectional view taken along a line A-A' in FIG. 3A. The photoelectric conversion element 34 is located on the left side, and the TFT 36 is located on the right side. In addition, a planarization layer 313 and a second protective layer 314 that protects the entire structure of the pixel are formed.

The bias line 33 is located above the photoelectric conversion element 34. The bias line 33 may be formed of a metallic layer and may be caused to substantially function as the light-shielding portion 37 for the photoelectric conversion element 34.

The photoelectric conversion element 34 includes an individual electrode 307, a second impurity semiconductor layer 308, a second semiconductor layer 309, a third impurity semiconductor layer 310, a common electrode 311, and a first protective layer 312 that protects the photoelectric conversion element 34. A drain electrode 303 is connected to the individual electrode 307 through a connection hole. The common electrode 311 is connected to the bias line 33 through a connection hole 35.

If an insensitive region is to be located on the photoelectric conversion element 34, a light-shielding portion made of metal or the like may be formed as an additional layer above the common electrode 311. The light-shielding portion may be enlarged to be wider than the total of a region functioning as the bias line 33 and a region functioning as the connection hole 35.

The TFT 36 includes a gate electrode 301, a source electrode 302, the drain electrode 303, an insulating layer 304, a first semiconductor layer 305, and a first impurity semiconductor layer 306. The gate electrode 301 of the TFT 36 forms a part of a control line 32. The source electrode 302 forms a part of the signal line 31. When the TFT 36 is turned on under control of the control line 32, electric charges from the photoelectric conversion element 34 can be transferred to the signal line 31 as electric signals.

The light-shielding portion 37 made of metal or the like can be formed, as needed, as an additional layer above the photoelectric conversion element 34 and the TFT 36. Similar to the bias line 33, the light-shielding portion 37 can be formed of a metallic layer, and the light-shielding portion 37 and the bias line 33 may be connected.

Instead of forming the light-shielding portion 37, the photoelectric conversion element 34 may be provided with a region where either a semiconductor layer including the second semiconductor layer 309 and the third impurity semiconductor layer 310 or the common electrode 311 is not provided, to thereby form an insensitive region that is insensitive to visible light.

Light to the photoelectric conversion element 34 is shielded to change the aperture shape of the aperture of each pixel, thereby making it possible to adjust the aperture MTF. A detailed layout of the light-shielding portion 37 will be described below. Light to the TFT 36 is shielded to thereby reduce effects on the switching operation of radiation and emission of visible light.

As semiconductor layers constituting the photoelectric conversion element 34, for example, the second impurity semiconductor layer 308 is formed of an n-type semiconductor layer, the second semiconductor layer 309 is formed of an i-type semiconductor layer, and the third impurity semiconductor layer 310 is formed of a p-type semiconductor layer, to thereby form a PIN photoelectric conversion element. However, the configuration of the photoelectric conversion element 34 is not limited to the above-described configuration. For example, the n-type semiconductor layer and the p-type semiconductor layer may be interchanged. Alternatively, a metal-insulator-semiconductor (MIS) photoelectric conversion element including an insulating layer, an i-type semiconductor layer, and an n-type semiconductor layer may be used.

FIG. 3B illustrates an example where the photoelectric conversion element 34 and the TFT 36 are on the same plane. However, the photoelectric conversion element 34 and the TFT 36 need not necessarily be on the same plane, but instead may be stacked.

FIG. 3C illustrates an aperture shape in each pixel illustrated in FIG. 3A and an average aperture shape in each of an X-direction and a Y-direction (referred to as a sampling profile).

An aperture 316 corresponds to a region of the photoelectric conversion element 34 excluding a light-shielding region 317 formed of a group of structures for shielding light incident on the photoelectric conversion element 34, such as the signal line 31, the control line 32, the bias line 33, the TFT 36, and the light-shielding portion 37. In FIG. 3C and other figures, the aperture is represented by a white area and the light-shielding region is represented by a black area.

If a grid pattern of a grid is vertically located, the aperture MTF is defined by a sampling profile 318 in the X-direction. Similarly, if a grid pattern is laterally located, the aperture MTF is defined by a sampling profile 319 in the Y-direction.

Next, characteristics of a grid pattern generated when a radiological image is captured using a grid will be described with reference to FIGS. 4A to 4E.

Figure 4A:
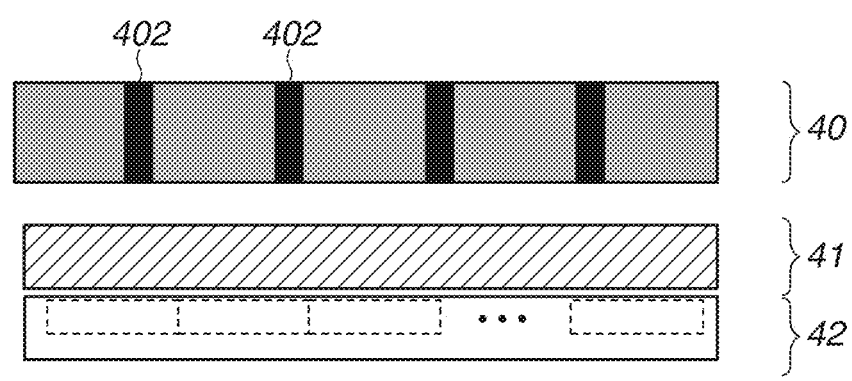
FIG. 4A is a schematic sectional view of a radiation imaging apparatus according to the exemplary embodiment.

FIG. 4A is a sectional view illustrating a section when a grid is located on the radiation imaging apparatus 104. FIG. 4A illustrates a state where a grid 40 is located and a fluorescence body 41 and a pixel unit 42 are located as the radiation imaging apparatus 104 below the grid 40. The pixel unit 42 is irradiated with visible light emitted from the fluorescence body 41. In general, a microlens for collecting light and a low-pass filter are not provided.

The grid 40 has a configuration in which an intermediate material 401, such as aluminum or carbon, that is likely to transmit X-rays, and an absorbing material 402, such as lead, that is likely to absorb X-rays are alternately arranged at regular intervals.

Thus, the grid 40 allows a signal component corresponding to primary radiation that travels directly from a radiation source through an object to transmit and shields a signal component corresponding to scattered rays that are generated by radiation scattered within the object, thereby making it possible to enhance the contrast of an object image.

First, a case where the grid 40 is irradiated with an X-ray is considered. FIG. 4B illustrates a signal profile representing a signal amount when the grid 40 is irradiated with an X-ray (X-ray signal amount after the X-ray is transmitted) and frequency characteristics of the signal.

The grid 40 forms a rectangular signal profile 403 as illustrated in FIG. 4B due to a difference in transmittance of the X-ray between the intermediate material 401 and the absorbing material 402 in the above-described structure.

Where a grid density is represented by D [number of grid lines/cm], a grid pattern peak frequency (fundamental) fg [line pair (lp)/millimeters (mm)] is represented by Formula (1) described below.

$$f_g = \frac{D}{10} \times \alpha \quad (1)$$

In Formula (1), α represents an enlargement factor. As illustrated in FIG. 4A, the grid 40 need not necessarily be located immediately above the pixel unit 42. An appropriate structure, such as the fluorescence body 41, a housing of the radiation imaging apparatus 104, or various attachments for mounting the grid 40, may be interposed. In this case, the width of the grid pattern is slightly enlarged depending on the positional relationship between the radiation generation apparatus 101 and the radiation imaging apparatus 104, so that the grid pattern appearing in an image has a peak frequency that is the grid density D multiplied by the enlargement factor. The enlargement factor α may be determined based on representative conditions in which the radiation imaging system 100 is used.

Specifically, the peak frequency fg is determined by at least one of the number of lines of the grid 40 and the enlargement factor determined depending on the positional relationship between the grid 40, the photoelectric conversion element 202, and the radiation generation apparatus 101.

Further, since the signal profile 403 has a rectangular shape, the frequency characteristics include not only the fundamental, but also Nth harmonic (N is a positive integer) as well as a fundamental 404 having a peak at fg [lp/mm].

In the radiation imaging apparatus 104, the X-ray that has passed through the grid 40 is subjected to a process of being converted into visible light in the fluorescence body 41. FIG. 4C illustrates schematic graphs illustrating a signal profile of visible light obtained when the X-ray incident on the fluorescence body 41 is converted into visible light and frequency characteristics of the signal.

An analog MTF 406 that the fluorescence body 41 has modulates a signal from the grid 40, and the high frequencies of the signal are attenuated as indicated by a signal profile 405. As frequency characteristics of the grid pattern, power at a grid pattern peak is attenuated due to the modulation by the analog MTF 406.

FIG. 4C illustrates an example where the analog MTF 406 is attenuated to substantially 0 at the peak frequency of 3×fg or more, and the harmonics at the peak frequency of 3×fg or more are not substantially resolved. The harmonics to be handled vary depending on the relationship between the peak frequency fg and the analog MTF 406. The above-described process is an analog process, and thus all signals can be recognized as continuous values.

Lastly, the visible light converted in the fluorescence body 41 is converted into a digital signal in the pixel unit 42. The process in which analog signals having continuous values are integrated by a constant pixel size and are converted into digital signals causes various effects according to a sampling theorem.

When the sampling pitch of the pixel unit 42 is represented by S [mm], a Nyquist frequency fs [lp/mm] can be represented by Formula (2) described below.

$$f_s = \frac{1}{S \times 2} \quad (2)$$

Signals with the Nyquist frequency fs or higher appear as folding noise in an image according to the sampling theorem.

FIG. 4D illustrates examples of the aperture shape of the pixel unit 42, a primary sampling profile in a specific direction, and the aperture MTF.

Considering an example of a pixel 408 with an aperture ratio of 100%, a sampling profile 409 in a specific direction (e.g., X-direction) has a rectangular shape with the width (sampling pitch) S [mm]. Where an aperture MTF is represented by MTFap and a width of the rectangular shape of a sampling profile is represented by U [mm], the aperture MTF indicates the spatial frequency component and has an absolute value of a sine function as represented by Formula (3) described below.

$$MTF_{ap} = \left| \frac{\sin(\pi U x)}{\pi U x} \right| \quad (3)$$

The characteristics of an aperture MTF 410 vary greatly even at frequencies higher than or equal to the Nyquist frequency fs.

Due to the characteristics of the sine function, the aperture MTF is substantially 0 when the spatial frequency x=k/U [lp/mm] (k=1, 2, ... ). In the case of the pixel 408, U=S holds, and thus the aperture MTF is substantially 0 when x=k×2×fs.

In practice, as illustrated in FIGS. 3A to 3C, the pixel includes various components in addition to the photoelectric conversion element 202, which makes it difficult to obtain the aperture ratio of 100%. For example, if the aperture ratio is decreased as in a pixel 411, the width U of the rectangular shape of the sampling profile is smaller than the sampling pitch S as indicated by a profile 412. Accordingly, the spatial frequency at which an aperture MTF 413 is substantially 0 is higher than that in the pixel 408.

For example, considering a case where the aperture ratio is sufficiently small as in a pixel 414, a sampling profile 415 has an impulse-like pattern, and an aperture MTF 416 is substantially 1 at all frequencies and thus is not affected by the modulation in sampling. Thus, the characteristics of the aperture MTF vary greatly depending on the aperture shape of each pixel.

As describe above, an object signal including a grid pattern is modulated by the analog MTF 406 and the aperture MTF before the object signal is converted into a digital signal in the pixel unit 42. A combination of the analog MTF 406 and the aperture MTF is referred to as a pre-sampling MTF. The signal from the grid pattern generally has a peak at a frequency larger than the Nyquist frequency fs, and the peak appears as folding noise in an image.

As illustrated in an example of FIG. 4E, the peak is at the spatial frequency exceeding the Nyquist frequency fs, and the grid pattern peak to be resolved by a pre-sampling MTF 417 is represented by fgM (corresponding to the second harmonic component in the example illustrated in FIG. 4E). This grid pattern peak generates a grid pattern due to folding noise at a frequency fg' represented by Formula (4) described below.

$$f_g' = |f_s - |f_{gM} - N \times f_s||$$

where $$0 \leq f_g' < f_s (N=1,2,3,...) \quad (4)$$

The grid pattern peak generated due to folding noise may be located in a low-frequency region depending on the relationship between the number of grid lines and the sampling pitch, which can make it difficult to remove the grid pattern by image processing. Accordingly, the relationship between the characteristics of the pre-sampling MTF in a frequency region exceeding the Nyquist frequency fs and the grid pattern peak is extremely important. In particular, the characteristics of the aperture MTF vary greatly depending on the aperture shape in each pixel. Thus, the aperture shape of each pixel is important to control generation of the grid pattern.

A highest frequency component included in an object signal depends on an object, and thus the spatial frequency in the low-frequency region described above cannot be accurately defined. However, in Japanese Patent Application Laid-Open No. 2002-330342, it is discussed that main components of an image are concentrated on a region with 30% or less of a sampling frequency 1/S. Removal of the grid pattern in the region by image processing can cause an adverse effect on the main components of the image. For example, the above-described conditions can be treated as the low-frequency region.

As described below, the aperture shape in the pixel is controlled to attenuate the aperture MTF at the grid pattern peak fgM, which may cause an issue, thereby it is possible to prevent the grid pattern from being resolved. A great variation in the aperture MTF at frequencies lower than or equal to the Nyquist frequency may cause an adverse effect on resolving of the object signal. Therefore, in one embodiment, the target grid pattern peak fgM may be frequencies higher than or equal to the Nyquist frequency.

Next, the shape of each pixel to control the generation of a grid pattern by adjustment of the aperture MTF will be described with reference to FIG. 5.

Various grids are used in imaging using the grid 103 by the radiation imaging apparatus 104. As representative examples, grids with grid densities of 34 grid lines, 40 grid lines, 52 grid lines, 60 gird lines, 70 grid lines, 80 grid lines, and the like can be used. A sampling pitch of about 0.050 [mm] to 0.2 [mm] is used depending on the apparatus as the sampling pitch of each pixel in the radiation imaging apparatus 104.

A combination of the grid 103 with an appropriate grid density and the sampling pitch of the pixel in the radiation imaging apparatus 104 is selected. However, this is not limiting depending on a use case. For example, a plurality of grid densities may be set at a certain sampling pitch. In this case, as described below, a grid pattern peak can be generated in a low-frequency region.

For example, a case is described where the sampling pitch is 0.125 mm, 40 grid lines are used, and the enlargement factor α=1 is set in Formula (1). Herein, a case is considered where the grid pattern is resolved by the analog MTF at the fundamental of 4 [lp/mm] and the second harmonic of 8 [lp/mm]. The Nyquist frequency fs=4 [lp/mm] holds, and the fundamental having a peak at 4 [lp/mm] and folding noise of the second harmonic of 40 grid lines generated at fgM=8 [lp/mm] is generated around 0 [lp/mm] in an image.

In this case, the former fundamental can be suitably removed by image processing as appropriate. On the other hand, the latter folding noise is visually observed as a moire pattern in a low-frequency region and cannot be easily removed by image processing, which may be an issue. In the case of using 80 grid lines, the fundamental is also 8 [lp/mm], which causes the same issue with the fundamental. In this case, the peak frequency of the grid pattern is around the sampling frequency 1/S and the generated grid pattern is around 0 [lp/mm], which is a case where an adverse effect on the image is much concerned.

As illustrated in FIG. 4D, when the aperture ratio is 100%, the aperture MTF has a minimum value at 8 [lp/mm], and has a response of substantially 0. Accordingly, the response of the pre-sampling MTF is sufficiently attenuated. Therefore, the second harmonic of 40 grid lines generated at 8 [lp/mm] is not resolved, thereby the adverse effect of the grid pattern on the image can be prevented.

However, in practice, as illustrated in FIGS. 3A to 3C, the pixel includes various components, such as various lines and TFTs, in addition to the photoelectric conversion element 202. Accordingly, it is difficult to obtain the aperture ratio of 100%, and the pre-sampling MTF at fgM=8 [lp/mm] has a certain value.

As illustrated in FIGS. 4A to 4E, in the case of applying rectangular sampling, as the aperture ratio is decreased, the frequency at which the aperture MTF has a minimum value increases. As a result, the aperture MTF at fgM=8 [lp/mm] has a high value, and the signal with the spatial frequency is resolved. Thus, in this case, the aperture, in the pixel with which the frequency at which the aperture MTF has a minimum value is decreased while the aperture ratio is also decreased, is formed, so that the aperture MTF at fgM=8 [lp/mm] is sufficiently attenuated.

FIG. 5 illustrates an example of the aperture. As an example of the aperture shape in the pixel, a light-shielding region is provided in the vicinity of the central portion of the photoelectric conversion element 202 of the pixel, and the aperture is divided into apertures 501 and 502. In this case, a sampling profile 503 in the X-direction has a region where a profile value is decreased in the vicinity of the central portion, and the value is a minimum value (such a profile shape is hereinafter referred to as a recessed shape).

For ease of illustration, FIG. 5 illustrates an example where the apertures 501 and 502 are apertures that form the same rectangular profile. However, the aperture shape is not limited to this example. For example, another configuration to be described below may also be used.

Each of the apertures 501 and 502 has an aperture MTF 504 as illustrated in FIG. 5. However, if the sampling profile is transformed into a frequency space by Fourier transform, Z-transform, or the like and spatial frequency characteristics including an imaginary space are taken into consideration, the apertures 501 and 502 indicate characteristics 506 and 507 in FIG. 5, respectively, with different phases. The spatial frequency characteristics of the sampling profile 503 formed of the combination of the apertures 501 and 502 correspond to characteristics 508 that are the total of the characteristics 506 and the characteristics 507, and an aperture MTF 505 can be calculated based on an absolute value of the characteristics 508.

It should be noted here that two rectangular profiles having high frequencies to be attenuated and having different phases can be combined and caused to interfere with each other to have a minimum value of an aperture MTF at a lower spatial frequency than that of a single rectangular profile. Thus, the aperture MTF 505 achieves the characteristics that greatly attenuate the response at the target fgM=8 [lp/mm] while reducing the overall aperture ratio.

The present exemplary embodiment illustrates an example where the response of the aperture MTF at fgM has a minimum value and is substantially 0. The minimum value need not necessarily be equal to fgM, and the response at fgM may have a predetermined value that is a sufficiently small value. The predetermined value will be described in detail below.

As described above, as with the sampling profile 503 having the recessed shape, it is possible to achieve the aperture of the pixel with which the characteristics of the aperture MTF are attenuated at any spatial frequency while the aperture ratio is reduced.

Figure 6A:
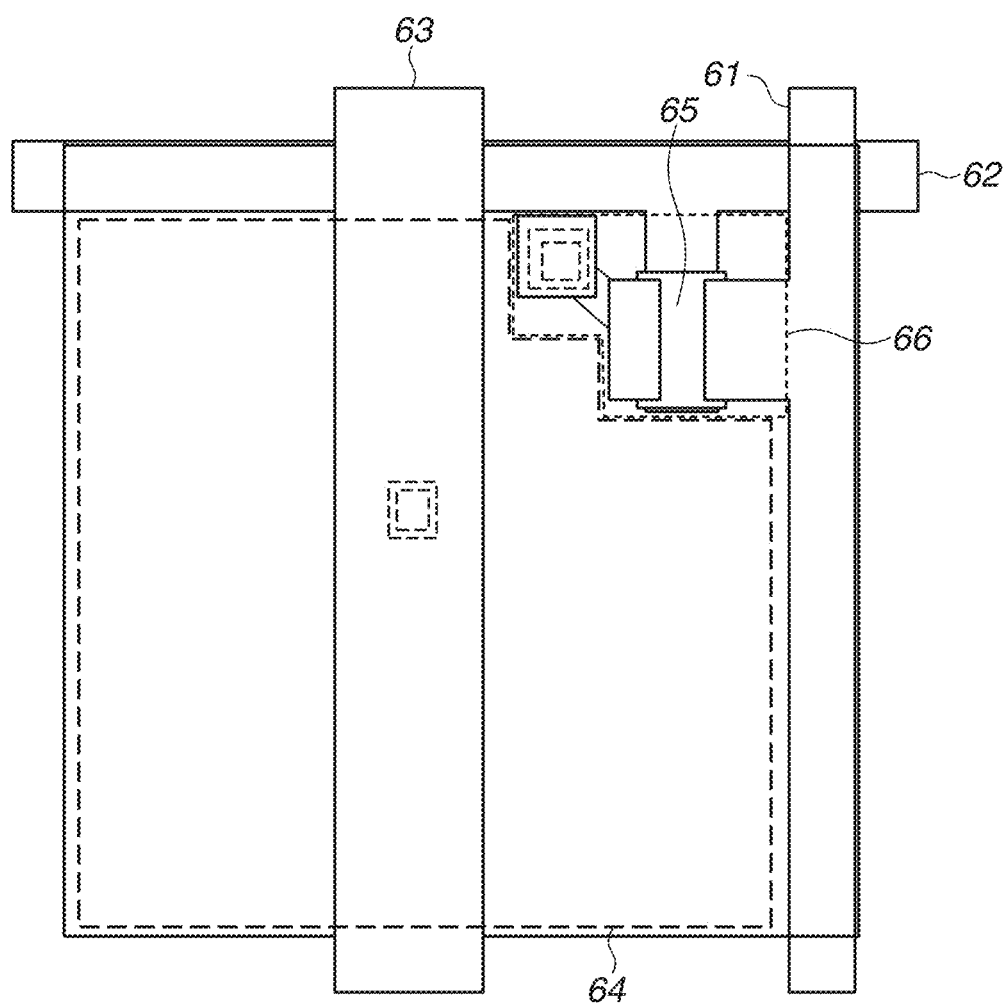
FIG. 6A is a schematic diagram illustrating a structure example of a pixel according to the exemplary embodiment.
Figure 6B:
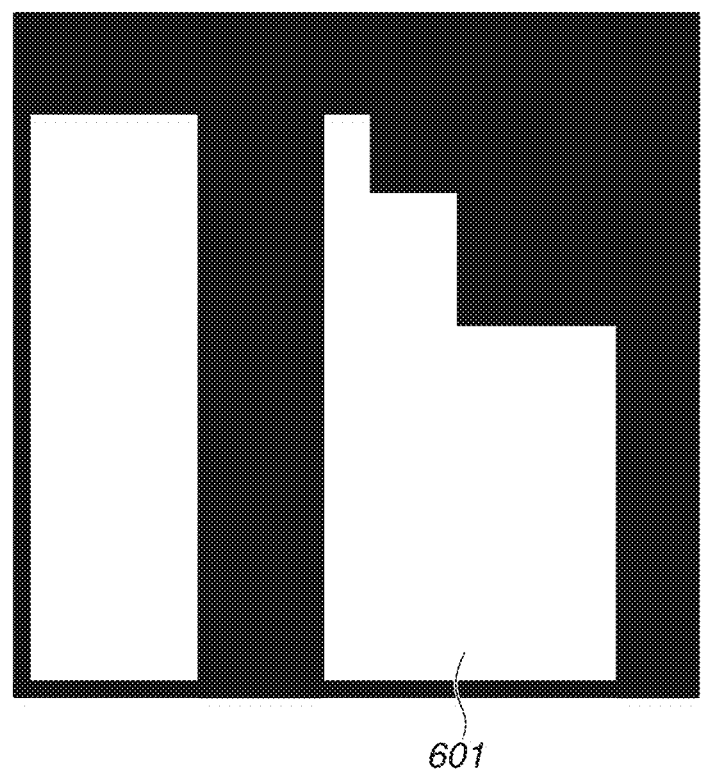
FIG. 6B is a schematic diagram illustrating an example of an aperture shape of a pixel according to the exemplary embodiment.

FIGS. 6A to 6E illustrate another example of the aperture. Various lines, TFTs, and the like are for the pixel to function. In consideration of structures thereof, it is difficult to form a sampling profile into a simple rectangular shape. For example, as illustrated in FIG. 6A, a signal line 61, a control line 62, a bias line 63, a photoelectric conversion element 64, a TFT 65, and a light-shielding portion 66 are provided, and as illustrated in FIG. 6B, an aperture 601 including the light-shielding region at the central portion thereof is formed.

Figure 6C:
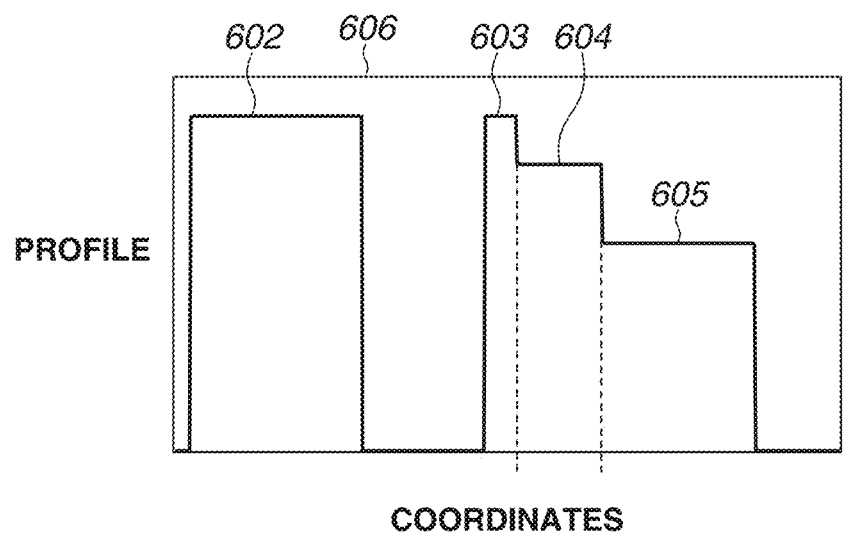
FIG. 6C illustrates an example of a sampling profile of a pixel according to the exemplary embodiment.

With this configuration, a sampling profile 606 in the X-direction can be formed into a recessed shape as illustrated in FIG. 6C. In this case, the bias line 63 is formed of a metallic line and functions as a light-shielding portion. The thickness and layout of the bias line 63 are determined so as to be the aperture MTF illustrated in FIG. 6D.

The light-shielding portion 66 is located above the TFT 65 to prevent a malfunction in the TFT 65 due to X-ray irradiation. In the present exemplary embodiment, the bias line 63 is configured as the light-shielding portion, but the bias line 63 is not limited to the configuration. If there is a limitation on design of the bias line 63, another light-shielding portion may be provided, as needed.

In this case, the sampling profile 606 illustrated in FIG. 6C is transformed into a frequency space by Fourier transform, Z-transform, or the like, and an absolute value of the frequency space is calculated to thereby calculate an aperture MTF 607. Thus, the aperture MTF 607 has a minimum value around the target fgM=8 [lp/mm], and has the characteristics that attenuate the response at fgM to substantially 0. With this configuration, generation of the grid pattern peak around 0 [lp/mm] in an image can be prevented when the grid pattern is located in the X-direction.

The layout of the light-shielding region can be determined, for example, as follows.

Figure 6E:
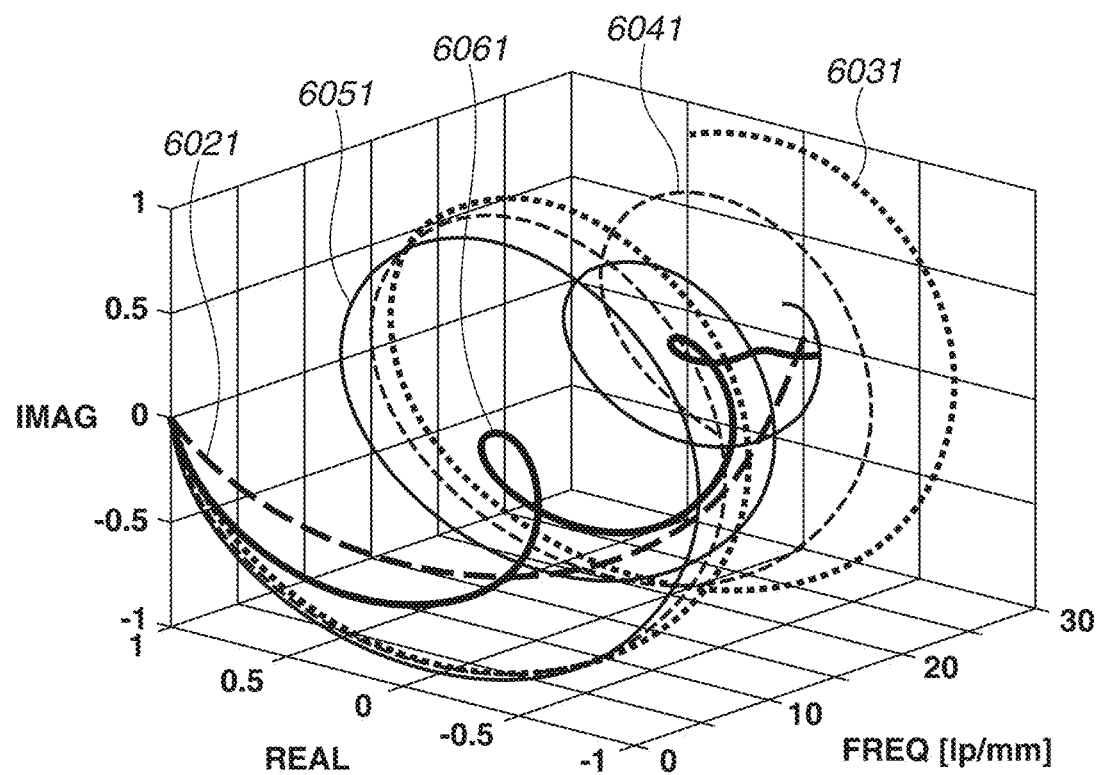
FIG. 6E illustrates an example of spatial frequency characteristics of signals associated with sampling in a pixel according to the exemplary embodiment.

The sampling profile 606 has a shape in which a plurality of rectangles 602 to 605 is combined. If each rectangular block is transformed into a frequency space and the spatial frequency characteristics of each rectangular block including the imaginary space are taken into consideration, as illustrated in FIG. 6E, characteristics 6021 to 6051 corresponding to the rectangles 602 to 605, respectively, can be obtained.

The aperture MTF 607 is obtained by addition of the characteristics 6021 to 6051, and thus the shape of the sampling profile can be determined so that the characteristics at the target fgM=8 [lp/mm] are attenuated. Further, the components of the pixel are arranged to achieve the shape of the sampling profile, thereby an optimum layout of the light-shielding region can be determined.

As described above, with regard to the aperture MTF in a case where necessary lines and the like are arranged in the pixel, if the spatial frequency at which the aperture MTF has a minimum value is higher than fgM, the light-shielding portion is provided so that the sampling shape becomes the recessed shape, thereby the aperture MTF is suitably adjusted. The present exemplary embodiment illustrates a case where the number of grid lines is 40, the enlargement factor α=1, and fgM=8 [lp/mm]. In rectangular sampling with an aperture ratio that is not 100%, the spatial frequency at which the aperture MTF has a minimum value is higher than fgM.

FIGS. 7A to 7D illustrate another example of the aperture.

Figure 7A:
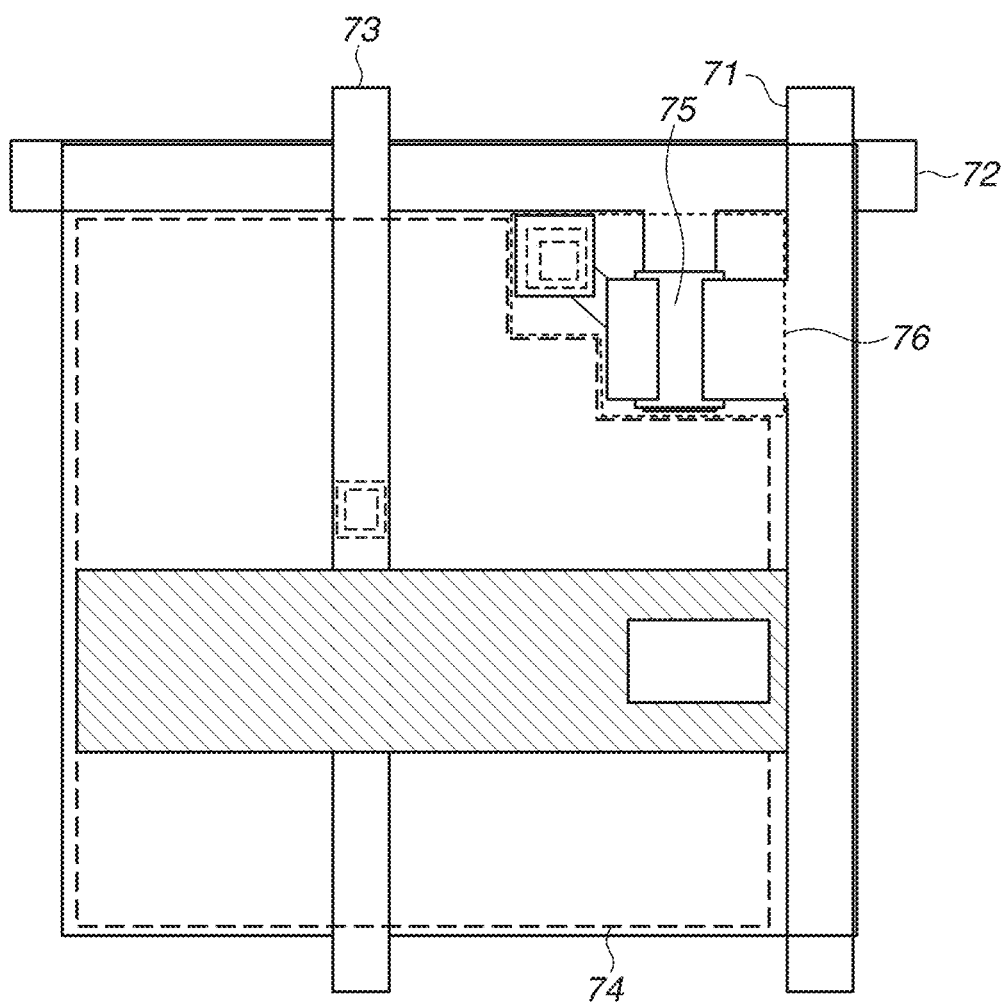
FIG. 7A is a schematic diagram illustrating a structure example of a pixel according to the exemplary embodiment.
Figure 7B:
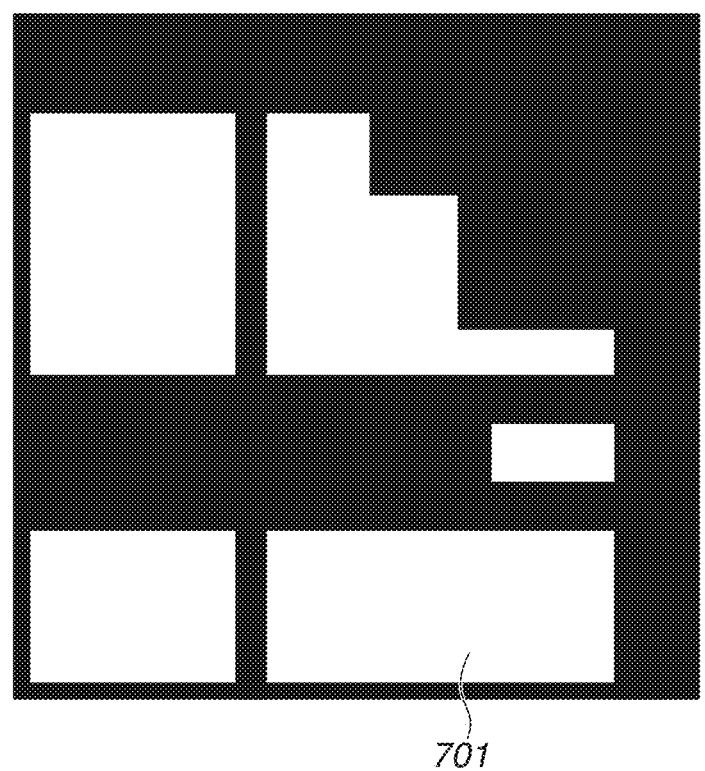
FIG. 7B is a schematic diagram illustrating an example of an aperture shape of a pixel according to the exemplary embodiment.

As illustrated in FIG. 7A, a signal line 71, a control line 72, a bias line 73, a photoelectric conversion element 74, a TFT 75, and a light-shielding portion 76 are arranged, and as illustrated in FIG. 7B, an aperture 701 including a light-shielding region at the central portion thereof is formed.

Figure 7C:
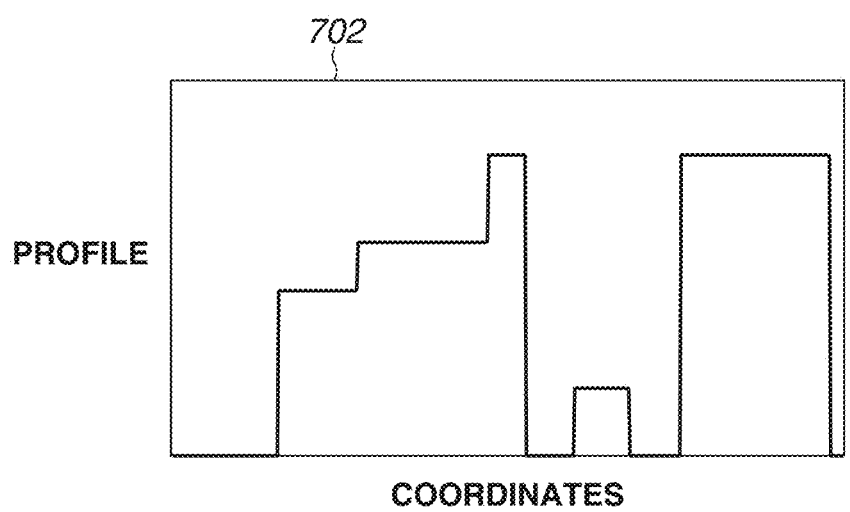
FIG. 7C illustrates an example of a sampling profile of a pixel according to the exemplary embodiment.
Figure 7D:
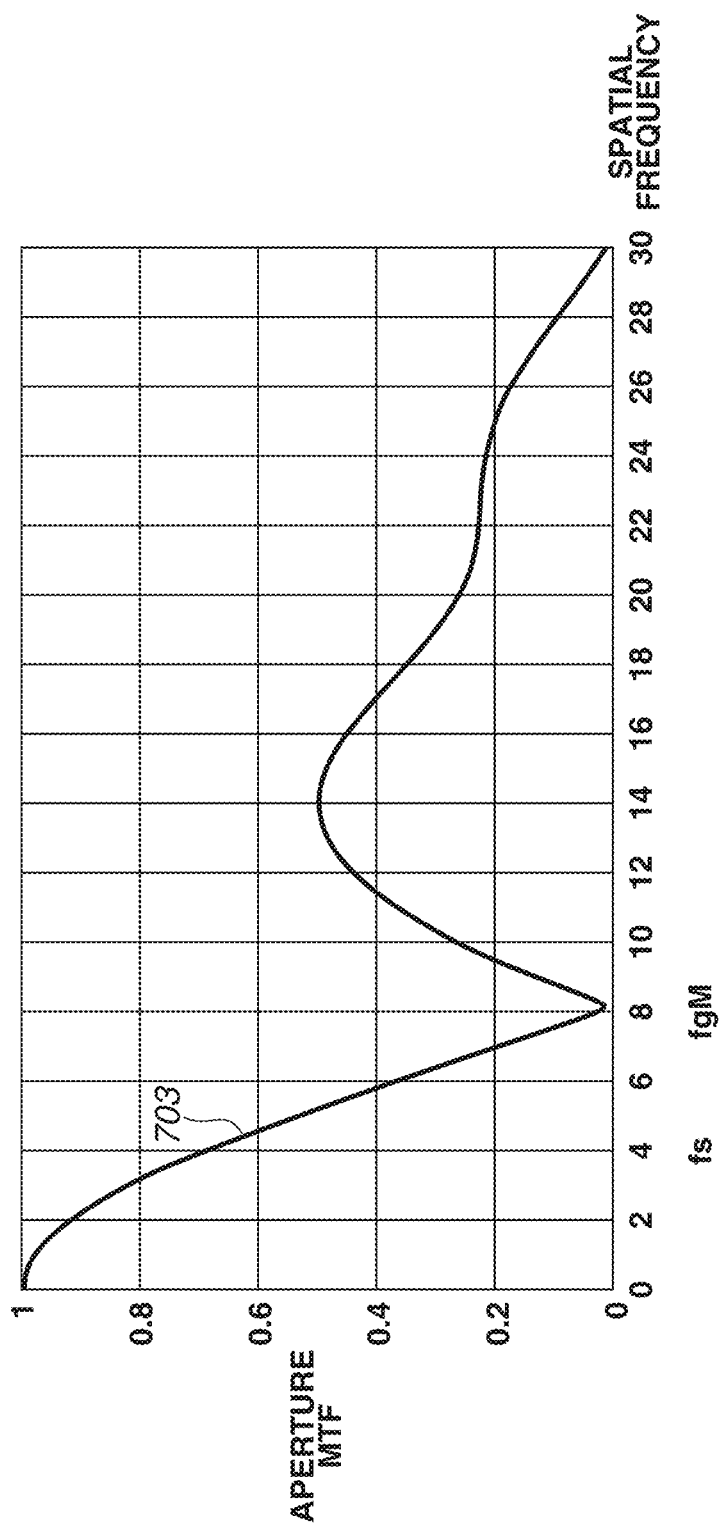
FIG. 7D illustrates an example of frequency characteristics of the aperture MTF of a pixel according to the exemplary embodiment.

With this configuration, a sampling profile 702 in the Y-direction can be formed with a recessed shape as illustrated in FIG. 7C. In this case, as illustrated in FIG. 7D, an aperture MTF 703 has a minimum value at the target fgM=8 [lp/mm] and has characteristics that attenuate the response to substantially 0.

An aperture region may be provided in a part of the light-shielding portion 76.

Thus, when the grid pattern is located in the Y-direction, the generation of the grid pattern peak around 0 [lp/mm] in an image can be prevented.

As described above, the configuration of each pixel illustrated in FIGS. 6A to 6E and 7A to 7D can prevent the adverse effect on the image when the grid pattern is located in one of the X-direction and the Y-direction. However, as described below with reference to FIGS. 8A to 8D, a configuration thereof having an aperture MTF favorable for both of the directions can be formed.

FIGS. 8A to 8D illustrate yet another example of the aperture.

Figure 8A:
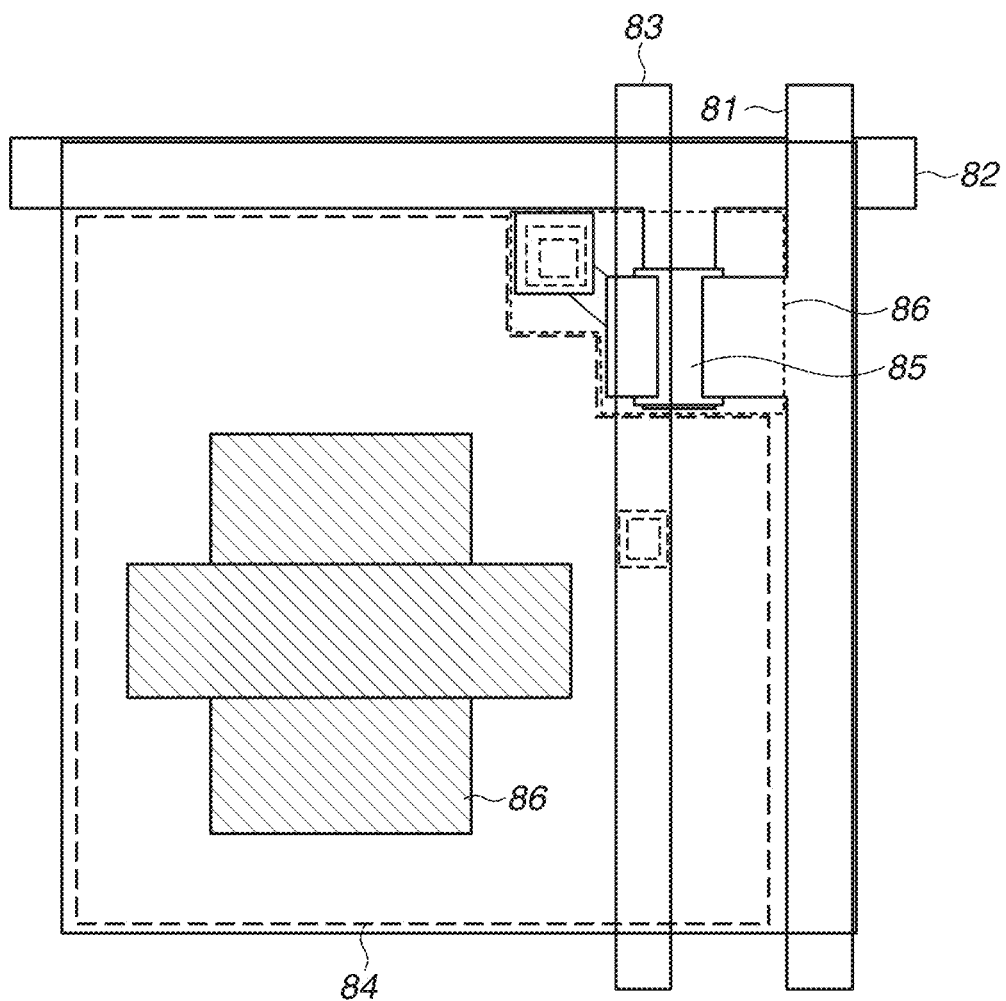
FIG. 8A is a schematic diagram illustrating a structure example of a pixel according to the exemplary embodiment.
Figure 8B:
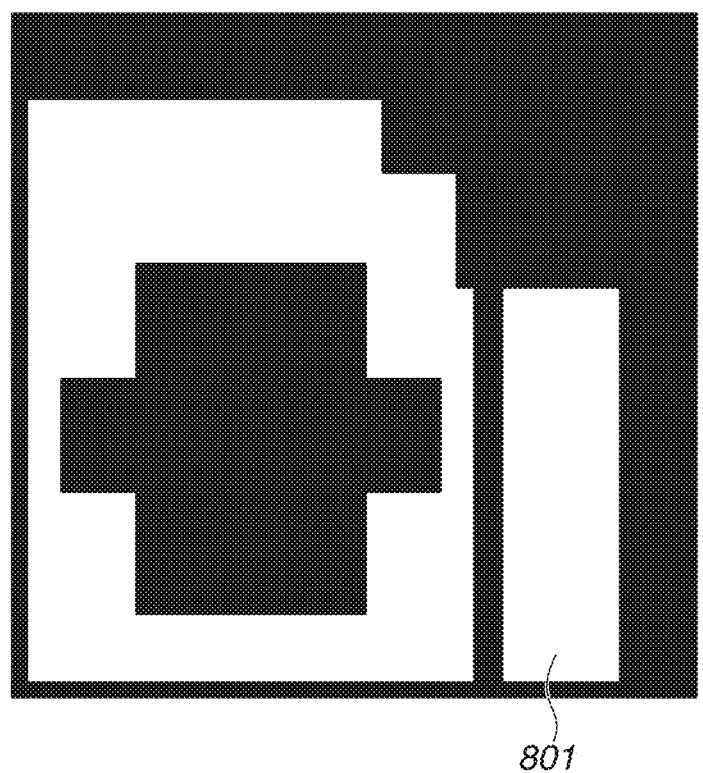
FIG. 8B is a schematic diagram illustrating an example of an aperture shape of a pixel according to the exemplary embodiment.

As illustrated in FIG. 8A, a signal line 81, a control line 82, a bias line 83, a photoelectric conversion element 84, a TFT 85, and a light-shielding portion 86 are arranged, and as illustrated in FIG. 8B, an aperture 801 including a light-shielding region at the central portion thereof is formed. Thus, as illustrated in FIG. 8C, a sampling profile 802 in the X-direction and a sampling profile 803 in the Y-direction can be obtained.

These sampling profiles 802 and 803 in the X-direction and the Y-direction are each formed to have a recessed shape with a region where the sensitivity has decreased at the central portion thereof. FIG. 8D illustrates an aperture MTF 804 obtained from the sampling profile in the X-direction and an aperture MTF 805 obtained from the sampling profile in the Y-direction.

The aperture MTFs 804 and 805 illustrated in FIG. 8D each have a minimum value at the target fgM=8 [lp/mm] and have characteristics that attenuate the response to substantially 0. While the present exemplary embodiment illustrates an example of the configuration in which the bias line 83 and the light-shielding portion 86 are separately prepared, a part of the bias line 83 can be used as the light-shielding portion.

The configuration makes it possible to prevent the generation of the grid pattern peak around 0 [lp/mm] in an image when the grid pattern is arranged in either the X-direction or the Y-direction.

The present exemplary embodiment described above illustrates the configuration in which the aperture MTF at the target fgM has a minimum value and has the characteristics that attenuate the response to substantially 0.

However, the minimum value need not necessarily be equal to fgM if a response at fgM is a predetermined value that is sufficiently low. The predetermined value may be any value at which the grid pattern generated in an image due to folding noise can be reduced to a level at which the image can be used without any issue. As described above, visibility of the grid pattern generated in an image due to folding noise is affected by the pre-sampling MTF (the product of the analog MTF and the aperture MTF) at the frequency.

As illustrated in FIGS. 9A to 9D, bringing the minimum value of the aperture MTF close to fgM makes it possible to reduce the aperture MTF at fgM to a sufficiently low level. In this case, the minimum value of the aperture MTF need not necessarily be equal to fgM. Accordingly, the degree of freedom of layout of the light-shielding portion can be increased and the area of the light-shielding portion can be reduced, which leads to an improvement of the aperture ratio.

Figure 9A:
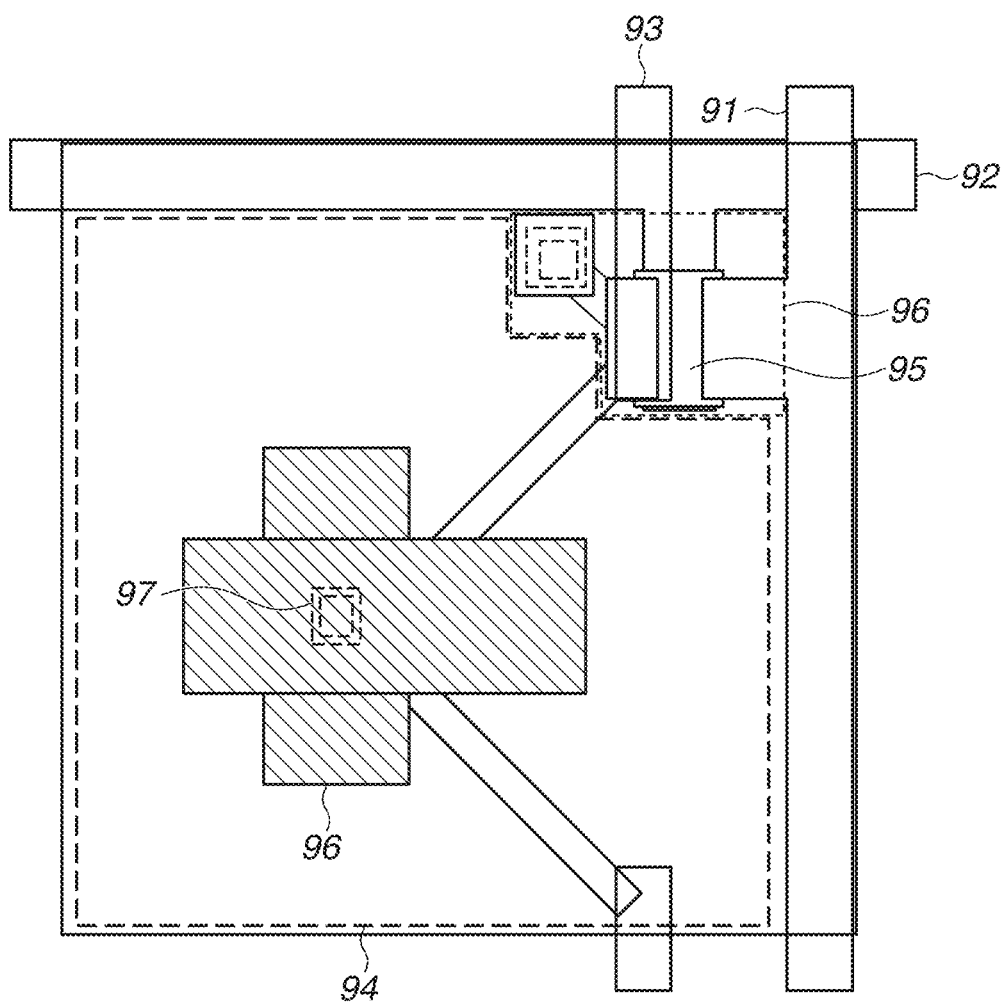
FIG. 9A is a schematic diagram illustrating a structure example of a pixel according to the exemplary embodiment.
Figure 9B:
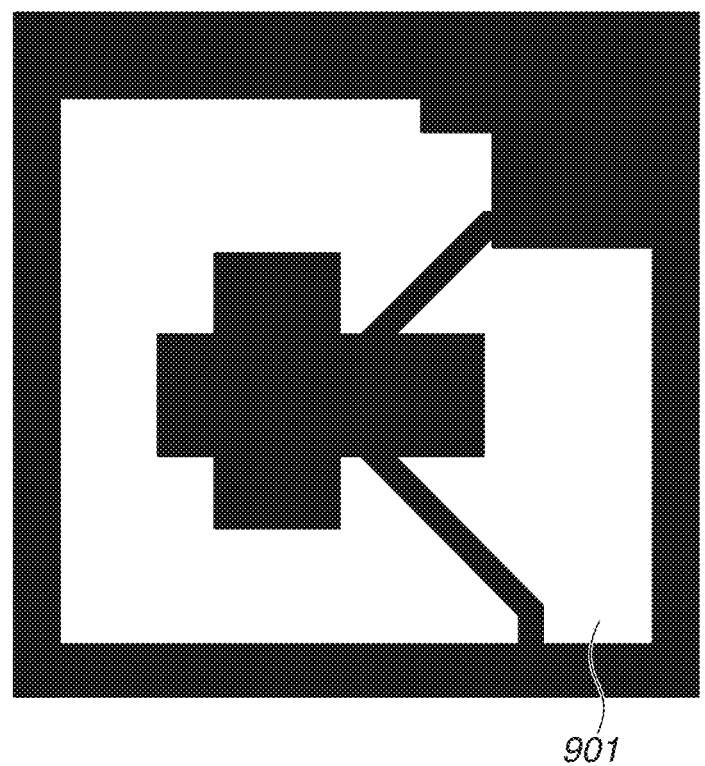
FIG. 9B is a schematic diagram illustrating an example of an aperture shape of a pixel according to the exemplary embodiment.

FIGS. 9A to 9D illustrate yet another example of the aperture. As illustrated in FIG. 9A, a signal line 91, a control line 92, a bias line 93, a photoelectric conversion element 94, a TFT 95, a light-shielding portion 96, and a connection hole 97 are arranged, and as illustrated in FIG. 9B, an aperture 901 including the light-shielding region at the central portion thereof is formed. Thus, as illustrated in FIG. 9C, a sampling profile 902 in the X-direction and a sampling profile 903 in the Y-direction can be obtained.

The sampling profiles 902 and 903 in the X-direction and the Y-direction are each formed to have a recessed shape with a region where the sensitivity has decreased at the central portion thereof. FIG. 9D illustrates an aperture MTF 904 obtained from the sampling profile in the X-direction and an aperture MTF 905 obtained from the sampling profile in the Y-direction. The aperture MTFs 904 and 905 illustrated in FIG. 9D each have a minimum value around 9 [lp/mm], which is larger than the target fgM=8 [lp/mm], but have characteristics that sufficiently attenuate the response at fgM=8 [lp/mm]. The present exemplary embodiment illustrates an example of the configuration in which the light-shielding portion 96 is extended to a region around a region where the functions of the bias line 93 and the connection hole 97 are secured.

The configuration makes it possible to prevent the generation of the grid pattern peak around 0 [lp/mm] in an image when the grid pattern is arranged in either the X-direction or the Y-direction, while reducing the area of the light-shielding portion to be smaller than that of the pixel illustrated in FIGS. 8A to 8D and improving the aperture ratio.

As a result of study, the inventors of the disclosure have found that, if the pre-sampling MTF at the frequency is less than or equal to 5%, almost no moire pattern can be visually observed in the grid pattern generated due to folding noise. When the analog MTF at fgM is represented by MTFana (fgM) and the aperture MTF is represented by MTFap (fgM), Formula (5) described below can be satisfied. An attenuation amount of the aperture MTF can be adjusted by adjustment of the position and area of the light-shielding portion 86.

$$\mathrm{MTF}_{ap}(fgM) \times \mathrm{MFT}_{ana}(fgM) \le 0.05 \quad (5)$$

In the aperture 901, MTFap (fgM) is substantially 0 (specifically, about 0.10). Accordingly, in this case, a fluorescence body with MTFana (fgM) of 0.5 or less may be used. In a fluorescence body made of cesium iodide (CsI) or gadolinium oxysulfide (GOS) that is generally used for a radiation imaging apparatus, the analog MTF generally has characteristics that attenuate the response as the frequency increases, and thus Formula (5) can be sufficiently satisfied.

While the present exemplary embodiment described above illustrates an example of the configuration of the pixel and the aperture MTF when the sampling pitch is 0.125 mm and 40 grid lines are used, the configuration is not to be limited to this configuration. The present exemplary embodiment can be applied to any combination of the sampling pitch and the number of grid lines.

Another example where the sampling pitch is 0.1 [mm] and 52 grid lines are used will be described. Also, in this case, the same beneficial effects can be obtained with a similar configuration.

In this case, the grid pattern to be resolved by the analog MTF includes the fundamental of 5.2 [lp/mm] and the second harmonic of 10.4 [lp/mm]. The Nyquist frequency fs is 5 [lp/mm]. The fundamental having a peak at 4.8 [lp/mm] due to folding noise and folding noise of the second harmonic of 52 grid lines generated at fgM=10.4 [lp/mm] are generated around 0.4 [lp/mm] according to Expression (4).

The former fundamental can be suitably removed by appropriate image processing. On the other hand, the latter folding noise is visually observed as a moire pattern in a low-frequency region, and thus cannot be easily removed by image processing. Also, in this case, the pixel with a sampling pitch of 0.1 mm has the pixel configuration illustrated in FIG. 8A, and the sampling profile with the recessed shape is formed, thereby it is possible to attenuate the aperture MTF at 10.4 [lp/mm].

In general, the peak frequency of a grid pattern when folding noise appears in a low-frequency region is at about the sampling frequency 1/S. However, the present exemplary embodiment can also be applied to other cases.

For example, a case is considered where the sampling pitch is 0.14 [mm] and 60 grid lines are used. In this case, the Nyquist frequency fs is 3.57 [lp/mm], and the fundamental of 6 [lp/mm] of the grid pattern generates the grid pattern at 1.14 [lp/mm] due to folding noise.

Figure 10A:
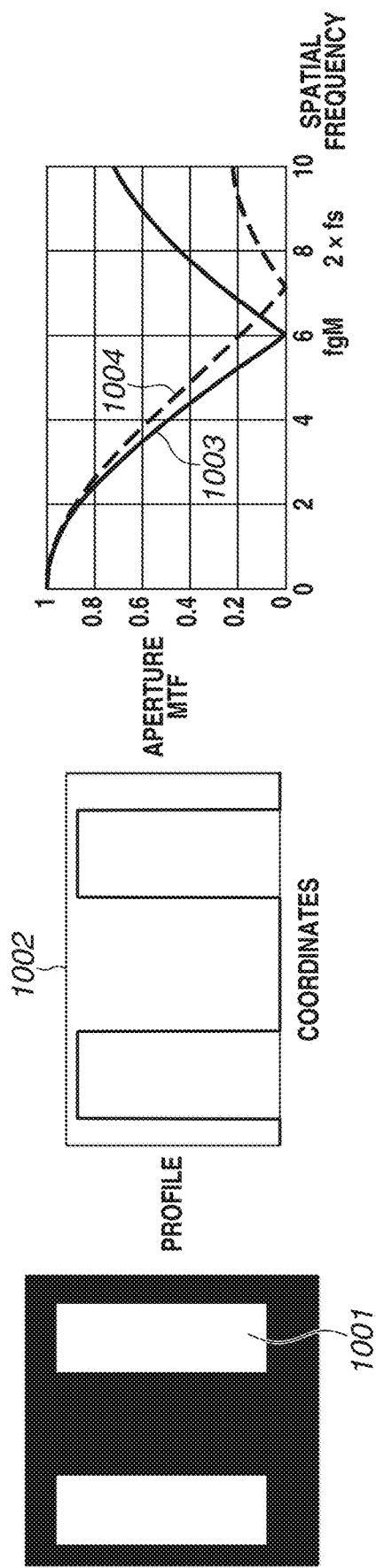
FIG. 10A schematically illustrates a pixel, a sampling profile, and frequency characteristics of the aperture MTF according to the exemplary embodiment.
Figure 10B:
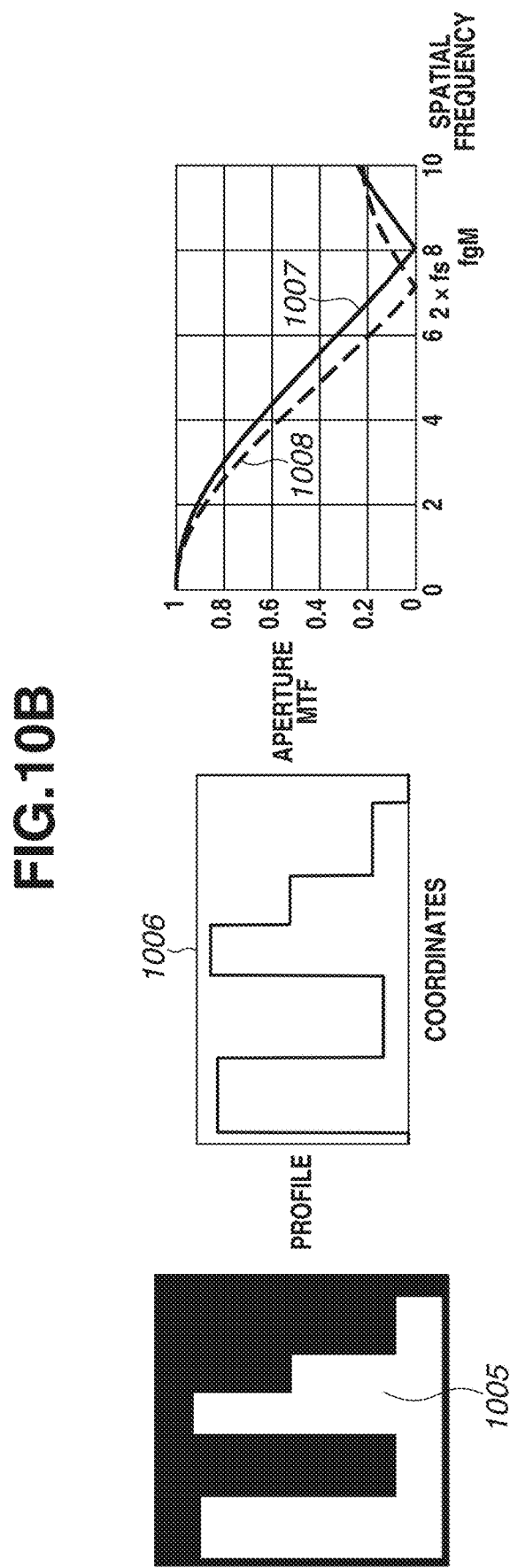
FIG. 10B schematically illustrates a pixel, a sampling profile, and frequency characteristics of the aperture MTF according to the exemplary embodiment.

Assuming herein that fgM is 6 [lp/mm], as illustrated in FIG. 10A, an aperture shape 1001 is formed, and a sampling profile 1002 is obtained as a recessed sampling shape. Thus, as with an aperture MTF 1003, the aperture MTF can be configured to have a minimum value around fgM and have characteristics that attenuate the response to substantially 0. In this case, it is obvious that the spatial frequency at which the aperture MTF 1003 corresponding to the aperture shape 1001 has a minimum value is lower than that of an aperture MTF 1004 in a pixel with the aperture ratio of 100%, while the aperture ratio is reduced.

As yet another example, a case is considered where the sampling pitch is 0.14 [mm] and 80 grid lines are used. In this case, the Nyquist frequency fs is 3.57 [lp/mm], and the fundamental of 8 [lp/mm] of the grid pattern generates the grid pattern at 2.71 [lp/mm] due to folding noise.

In this case, the grid pattern can be removed by image processing as discussed in Japanese Patent Application Laid-Open No. 2002-330342. However, as described above, the aperture MTF can be adjusted to thereby prevent the grid pattern from being resolved.

Assuming herein that fgM is 8 [lp/mm], as illustrated in FIG. 9B, an aperture shape 1005 is formed, and a sampling profile 1006 is obtained as a recessed sampling shape. Thus, as with an aperture MTF 1007, the aperture MTF can be configured to have a minimum value around fgM and have characteristics that attenuate the response to substantially 0. In this case, it is obvious that the aperture MTF 1007 corresponding to the aperture shape 1005 can be controlled so that the spatial frequency at which the aperture MTF 107 has a minimum value is higher than that of an aperture MTF 1008 in a pixel with the aperture ratio of 100%.

As illustrated in FIG. 4D, the aperture ratio can be decreased in rectangular sampling to increase the spatial frequency at which the aperture MTF has a minimum value. However, in many cases, there is a severe limitation in design, and it is difficult to secure a space for lines and the like that are necessary. In the present exemplary embodiment, however, the use of a profile with the recessed shape, as with the aperture shape 1005, makes it possible to increase the spatial frequency at which the aperture MTF can be attenuated to substantially 0 while maintaining the high degree of freedom of design.

The configuration as described above makes it possible to prevent the grid pattern from being resolved by attenuating the aperture MTF at the grid pattern peak fgM that may cause an issue. Consequently, it is possible to provide the radiation imaging apparatus 104 capable of effectively preventing the generation of a grid pattern.

Exemplary embodiments and modifications are described above. However, these exemplary embodiments and modifications are presented as examples, and are not intended to limit the scope of the disclosure. These novel exemplary embodiments and modifications can be carried out in various ways, and various omissions, substitutions, and changes may be made without departing from the gist of the disclosure. These exemplary embodiments and modifications are included in the scope and the gist of the disclosure, and are included in the claims and their equivalents of the disclosure.

As for the exemplary embodiments described above, the following claims are disclosed as one aspect and selective features of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-087839, filed May 30, 2022, and No. 2022-157705, filed Sep. 30, 2022, which are hereby incorporated by reference herein in their entirety.

What is claimed is:

1. An apparatus comprising:
a plurality of pixels each including a conversion element; and
a shielding layer covering the conversion element,
wherein the shielding layer is provided to cover at least a part of an aperture of the conversion element so that an aperture modulated transfer function (MTF) at a predetermined frequency of a signal obtained from the conversion element becomes less than or equal to a predetermined value.

2. The apparatus according to claim 1, wherein the shielding layer is provided so that a central value is smaller than peripheral values in at least one of a profile being an average of aperture shapes of apertures in a longitudinal direction and a profile being an average of aperture shapes of the apertures in a lateral direction.

3. The apparatus according to claim 1, wherein the shielding layer is provided at a central portion of the aperture.

4. The apparatus according to claim 1, wherein the predetermined frequency is a frequency included in a plurality of frequencies of a grid pattern generated in an image obtained by the apparatus performing imaging using a grid to remove scattered rays, the frequency being higher than or equal to a Nyquist frequency of the image appearing in a low-frequency region of the image as folding noise.

5. The apparatus according to claim 4, wherein the predetermined frequency is determined by at least one of the number of lines of the grid, the grid, the conversion element, and an enlargement factor generated based on a positional relationship of a generation apparatus configured to irradiate the apparatus with radiation.

6. The apparatus according to claim 1, wherein the shielding layer is provided so that at least one of the aperture MTF in a longitudinal direction and the aperture MTF in a lateral direction at the predetermined frequency becomes less than or equal to the predetermined value.

7. The apparatus according to claim 6,
wherein the conversion element includes a fluorescence body to convert the radiation into visible light, the fluorescence body being located above the conversion element, and
wherein in at least one of the longitudinal direction and the lateral direction, a pre-sampling MTF based on a product of an analog MTF included in the fluorescence body and the aperture MTF is less than or equal to 5% at the predetermined frequency.

8. The apparatus according to claim 1, wherein the shielding layer is a part of a line connected to each of the pixels and made of metal.

9. A system comprising:
an apparatus according to claim 1;
a radiation generation apparatus configured to irradiate the apparatus with radiation; and
a grid configured to remove scattered rays incident on the apparatus.

10. An apparatus comprising:
a fluorescence body configured to convert radiation into visible light; and
a plurality of pixels each including a conversion element,
wherein the apparatus is configured to obtain an image using a grid to remove scattered rays,
wherein the conversion element includes a conversion layer and two electrode layers located to sandwich the conversion layer, and
wherein a shielding portion is located at an aperture of the conversion element to cover the aperture to provide an insensitive region such that a profile obtained by projection in a direction orthogonal to a pattern of the grid has one or more minimum values in the aperture, the insensitive region being insensitive to visible light from the fluorescence body.

11. The apparatus according to claim 10, wherein the shielding portion is provided to cover at least a part of the aperture of the conversion element so that an aperture MTF at a predetermined frequency of a signal obtained from the conversion element becomes less than or equal to a predetermined value.

12. The apparatus according to claim 10, wherein the shielding portion is provided to extend to a region wider than a total of a region where a bias line is located in each of the pixels and a region functioning as a connection hole to connect to another layer so that an aperture MTF at a predetermined frequency of a signal obtained from the conversion element becomes less than or equal to a predetermined value.

13. The apparatus according to claim 10, wherein the predetermined frequency is a frequency included in a plurality of frequencies of a grid pattern generated in an image obtained by the apparatus performing using the grid, the frequency being higher than or equal to a Nyquist frequency of the image appearing in a low-frequency region of the image as folding noise.

14. The apparatus according to claim 13, wherein the predetermined frequency is determined by at least one of the number of lines of the grid, the grid, the conversion element, and an enlargement factor generated based on a positional relationship of a generation apparatus configured to irradiate the apparatus with radiation.

15. The apparatus according to claim 10, wherein the shielding portion is provided to bring a minimum value of an aperture MTF in at least one of a longitudinal direction and a lateral direction close to the predetermined frequency.

16. The apparatus according to claim 10, wherein the shielding portion is a region where any of the conversion layer and the electrode layers located to sandwich the conversion layer are not provided.

17. A system comprising:
the apparatus according to claim 10;
a radiation generation apparatus configured to irradiate the apparatus with radiation; and
a grid configured to remove scattered rays incident on the apparatus.

18. The system according to claim 17, wherein, in the apparatus, the shielding portion is provided to cover at least a part of the aperture of the conversion element so that an aperture MTF at a predetermined frequency of a signal obtained from the conversion element becomes less than or equal to a predetermined value.

19. The system according to claim 17, wherein, in the apparatus, the shielding portion is provided to extend to a region wider than a total of a region where a bias line is located in each of the pixels and a region functioning as a connection hole to connect to another layer so that an aperture MTF at a predetermined frequency of a signal obtained from the conversion element becomes less than or equal to a predetermined value.

20. The system according to claim 17, wherein, in the apparatus, the predetermined frequency is a frequency included in a plurality of frequencies of a grid pattern generated in an image obtained by the apparatus performing using the grid, the frequency being higher than or equal to a Nyquist frequency of the image appearing in a low-frequency region of the image as folding noise.

* * * * *